US010157546B2

(12) United States Patent
Godwin et al.

(10) Patent No.: US 10,157,546 B2
(45) Date of Patent: Dec. 18, 2018

(54) ANTI-DRONE FLIGHT PROTECTION SYSTEMS AND METHODS

(71) Applicant: ETAK Systems, LLC, Huntersville, NC (US)

(72) Inventors: Joshua Godwin, Charlotte, NC (US); Lee Priest, Charlotte, NC (US)

(73) Assignee: ETAK Systems, LLC, Huntersville, NC (US)

( * ) Notice: Subject to any disclaimer, the term of this patent is extended or adjusted under 35 U.S.C. 154(b) by 0 days.

(21) Appl. No.: 15/631,302

(22) Filed: Jun. 23, 2017

(65) Prior Publication Data
US 2017/0358212 A1 Dec. 14, 2017

Related U.S. Application Data

(63) Continuation-in-part of application No. 15/179,188, filed on Jun. 10, 2016, now Pat. No. 9,928,750, and a continuation-in-part of application No. 15/185,598, filed on Jun. 17, 2016, and a continuation-in-part of application No. 15/193,488, filed on Jun. 27, 2016, and a continuation-in-part of application No. 15/217,135, filed on Jul. 22, 2016, now Pat. No. 9,959,772, and a continuation-in-part of application No. 15/244,023, filed on Aug. 23, 2016, and a
(Continued)

(51) Int. Cl.
G08G 5/00 (2006.01)
H04K 3/00 (2006.01)
B64C 39/02 (2006.01)
H04W 4/021 (2018.01)

(52) U.S. Cl.
CPC .......... *G08G 5/006* (2013.01); *B64C 39/024* (2013.01); *G08G 5/0039* (2013.01); *H04K 3/44* (2013.01); *H04K 3/65* (2013.01); *H04K 3/90* (2013.01); *B64C 2201/146* (2013.01); *H04K 2203/22* (2013.01); *H04W 4/021* (2013.01)

(58) Field of Classification Search
CPC .... G08G 5/006; G08G 5/0039; B64C 39/024; B64C 2201/146; H04K 3/90; H04K 3/65; H04K 3/44; H04K 2203/22; H04W 4/021
See application file for complete search history.

(56) References Cited

U.S. PATENT DOCUMENTS 9,317,036 B2 * 4/2016 Wang ................... G05D 1/0214
9,588,516 B1 * 3/2017 Gurel ................... G05D 1/0033
(Continued)

OTHER PUBLICATIONS

Technology and the Future Evolution of the ATC System, Chapter 5, Airport and Air Traffic Control System, pp. 67-98.
(Continued)

*Primary Examiner* — Russell Frejd
(74) *Attorney, Agent, or Firm* — Clements Bernard Walker PLLC; Lawrence A. Baratta, Jr.

(57) ABSTRACT

Systems and methods for preventing flight of one or more Unmanned Aerial Vehicles (UAVs) in no-fly zones include receiving one or more no-fly zones each defined as geo-fences with associated coordinates; preventing one or more UAVs from entering the one or more no-fly zones by one or more of: transmitting the geo-fences to the one or more UAVs, transmitting avoidance commands to the one or more UAVs from an avoidance device located at a no-fly zone, and disrupting radio communication to the one or more UAVs from the avoidance device.

18 Claims, 23 Drawing Sheets

Related U.S. Application Data continuation-in-part of application No. 15/255,672, filed on Sep. 2, 2016, and a continuation-in-part of application No. 15/268,831, filed on Sep. 19, 2016, and a continuation-in-part of application No. 15/292,782, filed on Oct. 13, 2016, and a continuation-in-part of application No. 15/338,559, filed on Oct. 31, 2016, and a continuation-in-part of application No. 15/448,968, filed on Mar. 3, 2017, and a continuation-in-part of application No. 15/584,422, filed on May 2, 2017.

(56) References Cited

U.S. PATENT DOCUMENTS

| | | | |
|---|---|---|---|
| 2008/0103649 A1* | 5/2008 | Shen | H04K 3/226 701/23 |
| 2014/0142787 A1* | 5/2014 | Tillotson | G05D 1/101 701/3 |
| 2015/0336667 A1* | 11/2015 | Srivastava | B64C 39/024 701/2 |
| 2015/0339931 A1* | 11/2015 | Yu | G05D 1/0214 701/122 |
| 2016/0005318 A1* | 1/2016 | Wang | G05D 1/0214 701/15 |
| 2016/0036494 A1* | 2/2016 | Dobyns | H04K 3/68 455/41.1 |
| 2016/0163203 A1* | 6/2016 | Wang | G05D 1/0214 701/3 |
| 2017/0069214 A1* | 3/2017 | Dupray | G08G 5/0021 |
| 2017/0094527 A1* | 3/2017 | Shattil | H04L 43/18 |
| 2017/0134963 A1* | 5/2017 | Priest | H04W 16/18 |
| 2017/0192089 A1* | 7/2017 | Parker | G01S 3/782 |

OTHER PUBLICATIONS

Operator Benefits of Future Air Navigation System, The Boeing Company, pp. 1-4.
What are the essential elements of a control tower?, Aviation Stack Exchange is a question and answer site for aircraft pilots, mechanics, and enthusiasts, pp. 1-2.

* cited by examiner

ANTI-DRONE FLIGHT PROTECTION SYSTEMS AND METHODS

CROSS-REFERENCE TO RELATED APPLICATION(S)

The present patent/application is continuation-in-part of, and the content of each is incorporated by reference herein

| Filing Date | Serial No. | Title |
| --- | --- | --- |
| May 2, 2017 | 15/584,422 | 3D COVERAGE MAPPING OF WIRELESS NETWORKS WITH UNMANNED AERIAL VEHICLES |
| Mar. 3, 2017 | 15/448,968 | EMERGENCY SHUTDOWN AND LANDING FOR UNMANNED AERIAL VEHICLES WITH AIR TRAFFIC CONTROL SYSTEMS |
| Oct. 31, 2016 | 15/338,559 | WAYPOINT DIRECTORY IN AIR TRAFFIC CONTROL SYSTEMS FOR UNMANNED AERIAL VEHICLES |
| Oct. 13, 2016 | 15/292,782 | MANAGING DYNAMIC OBSTRUCTIONS IN AIR TRAFFIC CONTROL SYSTEMS FOR UNMANNED AERIAL VEHICLES |
| Sep. 19, 2016 | 15/268,831 | MANAGING DETECTED OBSTRUCTIONS IN AIR TRAFFIC CONTROL SYSTEMS FOR UNMANNED AERIAL VEHICLES |
| Sep. 2, 2016 | 15/255,672 | OBSTRUCTION DETECTION IN AIR TRAFFIC CONTROL SYSTEMS FOR UNMANNED AERIAL VEHICLES |
| Aug. 23, 2016 | 15/244,023 | AIR TRAFFIC CONTROL MONITORING SYSTEMS AND METHODS FOR UNMANNED AERIAL VEHICLES |
| Jul. 22, 2016 | 15/217,135 | FLYING LANE MANAGEMENT SYSTEMS AND METHODS FOR UNMANNED AERIAL VEHICLES |
| Jun. 27, 2016 | 15/193,488 | AIR TRAFFIC CONTROL OF UNMANNED AERIAL VEHICLES FOR DELIVERY APPLICATIONS |
| Jun. 17, 2016 | 15/185,598 | AIR TRAFFIC CONTROL OF UNMANNED AERIAL VEHICLES CONCURRENTLY USING A PLURALITY OF WIRELESS NETWORKS |
| Jun. 10, 2016 | 15/179,188 | AIR TRAFFIC CONTROL OF UNMANNED AERIAL VEHICLES VIA WIRELESS NETWORKS |

FIELD OF THE DISCLOSURE

The present disclosure relates generally to anti-drone or Unmanned Aerial Vehicles (UAVs). More particularly, the present disclosure relates to systems and methods for anti-drone flight protection to keep drones or UAVs from certain locations.

BACKGROUND OF THE DISCLOSURE

Use of Unmanned Aerial Vehicles (UAVs or "drones") is proliferating. UAVs are used for a variety of applications such as search and rescue, inspections, security, surveillance, scientific research, aerial photography and video, surveying, cargo delivery, and the like. With the proliferation, the Federal Aviation Administration (FAA) is providing regulations associated with the use of UAVs. Existing air traffic control in the United States is performed through a dedicated air traffic control network, i.e., the National Airspace System (NAS). However, it is impractical to use the existing air traffic control network for UAVs because of the sheer quantity of UAVs. Also, it is expected that UAVs will be autonomous, requiring communication for flight control as well. There will be a need for systems and methods to provide air traffic control and communication to UAVs.

There is a great deal of discussion and anticipation for using drones for applications such as package delivery. For example, online stores, brick & mortar stores, restaurants, etc. can use drones to provide delivery to end consumers. As the number of applications increase and the number of UAVs concurrently in flight also increase, there are various issues that have to be addressed relative to air traffic control.

As UAV use proliferates, there is a need to coordinate flying lanes to avoid collisions, obstructions, etc. Of course, with UAV use as a hobby, collision avoidance is not a major concern. However, once UAVs begin widespread delivery applications, collisions will be a major problem due to the potential damage to deliveries as well as threats to people and property on the ground. Thus, there is a need for flying lane management systems and methods.

Further, it is expected that there will be orders of magnitude more UAVs in flight in any geographic region, zone, coverage area, etc. than regular aircraft. Accordingly, conventional monitoring systems and methods are inadequate to support UAV monitoring. Thus, there is a need for optimized UAV monitoring systems and methods.

Further, obstructions on or near the ground pose a significant risk to UAVs as most UAVs fly only several hundred feet above the ground, unlike airplanes which fly at thousands of feet above the ground. Stated differently, air traffic control for airplanes focuses on other airplanes primarily whereas air traffic control for UAVs must deal with other UAVs and with near ground obstructions.

Additionally, obstructions on or near the ground are different from in-air obstructions (other aircraft) and require additional management. That is, it is not enough to simply note a single location (e.g., Global Positioning Satellite (GPS) coordinate) since these obstructions may be of varying sizes, heights, etc.

Further, with the expected growth of UAVs, there will be situations where UAVs are in distress, failure, unauthorized, in no-fly zones, etc. and there exists a need for techniques to shutdown and/or cause immediate landing of these UAVs. Importantly, an uncontrolled shutdown and/or landing could be hazardous to physical structures, vehicles, people, etc. on the ground. Thus, there exists a need to coordinate shutdowns and/or landings of UAVs when needed.

Further, conventional wireless networks (e.g., Long Term Evolution (LTE), 5G, etc.) are optimized with the assumption User Equipment (UE) is located on the ground or close to it (e.g., multi-story buildings). There has not been a need to have adequate wireless coverage above the ground, e.g., several hundred feet to several thousand feet. With the proliferation of UAVs and the desire to have Air Traffic Control (ATC) using existing wireless networks (e.g., LTE, 5G, etc.), it is important to ensure adequate coverage, to identify coverage gaps, etc.

In addition to the aforementioned issues with UAV or drone proliferation, there is a need to keep UAVs from entering telecommunication compounds/cell sites, data centers, historical monuments/locations, privacy centers, and other no fly zones which companies/persons want to deem a no-fly zone.

BRIEF SUMMARY OF THE DISCLOSURE

In an exemplary embodiment, a method for preventing flight of one or more Unmanned Aerial Vehicles (UAVs) in no-fly zones includes receiving one or more no-fly zones each defined as geo-fences with associated coordinates;

preventing one or more UAVs from entering the one or more no-fly zones by one or more of: transmitting the geo-fences to the one or more UAVs, transmitting avoidance commands to the one or more UAVs from an avoidance device located at a no-fly zone, and disrupting radio communication to the one or more UAVs from the avoidance device.

In another exemplary embodiment, an avoidance device for preventing flight of one or more Unmanned Aerial Vehicles (UAVs) in no-fly zones includes wireless interfaces; a processor communicatively coupled to the wireless interfaces; and memory storing instructions that, when executed, cause the processor to receive one or more no-fly zones each defined as geo-fences with associated coordinates; prevent one or more UAVs from entering the one or more no-fly zones by one or more of: transmission of the geo-fences to the one or more UAVs, transmission of avoidance commands to the one or more UAVs located at a no-fly zone, and disruption of radio communication to the one or more UAVs.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
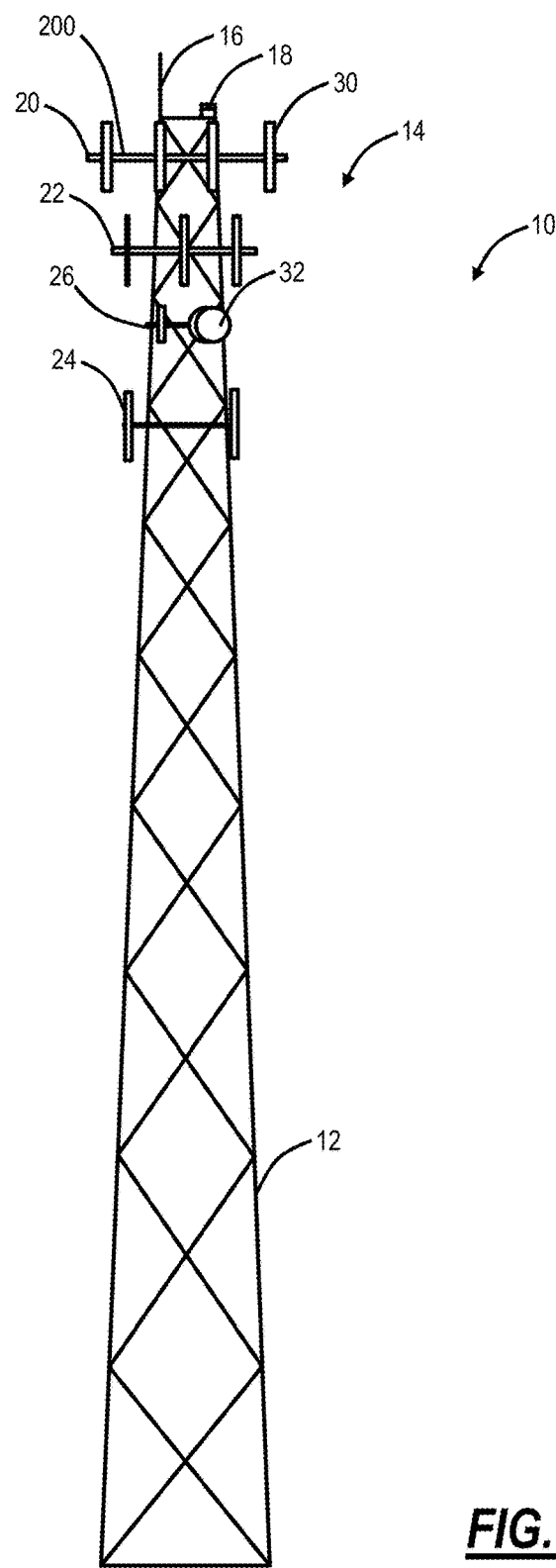
FIG. 1 is a diagram of a side view of an exemplary cell site.

Again, in various exemplary embodiments, the present disclosure relates to systems and methods for anti-drone flight protection to keep drones or UAVs from certain locations. Various embodiments include use of an Air Traffic Control (ATC) system with programming, an apparatus which enforces a no-fly zone or geo-fence, a database regularly updated with coordinates of no-fly zones or geo-fences, and the like. These embodiments ensure drones or UAVs (referred to herein as UAVs) do not enter specific locations, such as telecommunication compounds/cell sites, data centers, historical monuments/locations, privacy centers, and the like.

Further, in various exemplary embodiments, the present disclosure relates to systems and methods for three-dimensional (3D) coverage mapping of wireless networks using Unmanned Aerial Vehicles (UAVs or "drones"). A UAV is equipped with a spectrum measurement device, e.g., a spectrum analyzer, and the UAV flies about a cell site's coverage area taking measurements. The associated measurements are used to develop a 3D coverage map of the coverage area. The 3D coverage map can be used to identify coverage gaps above the ground in the coverage area. With known coverage gaps, an operator can add antennas, adjust antennas, etc. to close the gaps. Also, an Air Traffic Control (ATC) system using a wireless network associated with the cell site can adjust UAV flight accordingly, i.e., to avoid such coverage gaps. Further, the UAV-based coverage map is more efficient and cost effective than conventional approaches which utilize on-the-ground measurements.

Further, in various exemplary embodiments, the present disclosure relates to systems and methods for emergency shutdown and landing for UAVs using air traffic control systems. Specifically, the systems and methods for emergency shutdown and landing utilize the air traffic control system and/or the UAV to 1) determine an emergency shutdown and/or landing, 2) timing and location for the emergency shutdown and/or landing, and 3) implementation of the emergency shutdown and/or landing. Advantageously, the air traffic control system has a unified view of UAVs in a given geography and can intelligently determine the timing and location based on the geography to minimize risk of harm to physical property, vehicles on the road, people on the ground, etc. UAVs can be programmed with so-called "kill codes" for implementation of the emergency shutdown and/or landing with the air traffic control systems. Alternatively, the UAVs can perform the emergency shutdown and/or landing without communication to the air traffic control system. In all embodiments, the objective of the emergency shutdown and/or landing is to minimize risk and damage, i.e., the ideal scenario for a distressed or rogue UAV is to safely shutdown and land in an empty field.

Further, in various exemplary embodiments, the present disclosure relates to systems and methods for with a waypoint directory in air traffic control systems for UAVs. A waypoint is a reference point in physical space used for purposes of navigation in the air traffic control systems for UAVs. Variously, the systems and methods describe managing waypoints by an air traffic control system which uses one or more wireless networks and by associated UAVs in communication with the air traffic control system. The waypoints can be defined based on the geography, e.g., different sizes for dense urban areas, suburban metro areas, and rural areas. The air traffic control system can maintain a status of each waypoint, e.g., clear, obstructed, or unknown. The status can be continually updated and managed with the UAVs and used for routing the UAVs.

In another exemplary embodiment, the present disclosure relates to the present disclosure relates to systems and methods for managing detected obstructions with air traffic control systems for UAVs. Variously, the systems and methods provide a mechanism in the Air Traffic Control (ATC) System to characterize detected obstructions at or near the ground. In an exemplary embodiment, the detected obstructions are dynamic obstructions, i.e., moving at or near the ground. Examples of dynamic obstructions can include, without limitation, other UAVs, vehicles on the ground, cranes on the ground, and the like. Generally, dynamic obstruction management includes managing other UAVs at or near the ground and managing objects on the ground which are moving which could either interfere with landing or with low-flying UAVs. In various exemplary embodiment, the UAVs are equipped to locally detect and identify dynamic obstructions for avoidance thereof and to notify the ATC system for management thereof.

In another exemplary embodiment, the detected obstructions are static obstructions, i.e., not moving, which can be temporary or permanent. The ATC system can implement a mechanism to accurately define the location of the detected obstructions, for example, a virtual rectangle, cylinder, etc. defined by location coordinates and altitude. The defined location can be managed and determined between the ATC system and the UAVs as well as communicated to the UAVs for flight avoidance. That is, the defined location can be a "no-fly" zone for the UAVs. Importantly, the defined location can be precise since it is expected there are a significant number of obstructions at or near the ground and the UAVs need to coordinate their flight to avoid these obstructions. In this manner, the systems and methods seek to minimize the no-fly zones.

Further, in various exemplary embodiments, the present disclosure relates to obstruction detection systems and methods with air traffic control systems for UAVs. Specifically, the systems and methods use a framework of an air traffic control system which uses wireless (cell) networks to communicate with various UAVs. Through such communication, the air traffic control system receives continuous updates related to existing obstructions whether temporary or permanent, maintains a database of present obstructions, and updates the various UAVs with associated obstructions in their flight plan. The systems and methods can further direct UAVs to investigate, capture data, and provide such data for analysis to detect and identify obstructions for addition in the database. The systems and methods can make use of the vast data collection equipment on UAVs, such as cameras, radar, etc. to properly identify and classify obstructions.

Further, in various exemplary embodiments, the present disclosure relates to air traffic control monitoring systems and methods for UAVs. Conventional FAA Air Traffic Control monitoring approaches are able to track and monitor all airplanes flying in the U.S. concurrently. Such approaches do not scale with UAVs which can exceed airplanes in numbers by several orders of magnitude. The systems and methods provide a hierarchical monitoring approach where zones or geographic regions of coverage are aggregated into a consolidated view for monitoring and control. The zones or geographic regions can provide local monitoring and control while the consolidated view can provide national monitoring and control in addition to local monitoring and control through a drill-down process. A consolidated server can aggregate data from various sources of control for zones or geographic regions. From this consolidated server, monitoring and control can be performed for any UAV communicatively coupled to a wireless network.

Further, in various exemplary embodiments, flying lane management systems and methods are described for UAVs such as through an air traffic control system that uses one or more wireless networks. As described herein, a flying lane for a UAV represents its path from takeoff to landing at a certain time. The objective of flying lane management is to prevent collisions, congestion, etc. with UAVs in flight. A flying lane can be modeled as a vector which includes coordinates and altitude (i.e., x, y, and z coordinates) at a specified time. The flying lane also can include speed and heading such that the future location can be determined. The flying lane management systems utilize one or more wireless networks to manage UAVs in various applications.

Note, flying lanes for UAVs have significant differences from conventional air traffic control flying lanes for aircraft (i.e., commercial airliners). First, there will be orders of magnitude more UAVs in flight than aircraft. This creates a management and scale issue. Second, air traffic control for UAVs is slightly different than aircraft in that collision avoidance is paramount in aircraft; while still important for UAVs, the objective does not have to be collision avoidance at all costs. It is further noted that this ties into the scale issue where the system for managing UAVs will have to manage so many more UAVs. Collision avoidance in UAVs is about avoiding property damage in the air (deliveries and the UAVs) and on the ground; collision avoidance in commercial aircraft is about safety. Third, UAVs are flying at different altitudes, much closer to the ground, i.e., there may be many more ground-based obstructions. Fourth, UAVs do not have designated takeoff/landing spots, i.e., airports, causing the different flight phases to be intertwined more, again adding to more management complexity.

To address these differences, the flying lane management systems and methods provide an autonomous/semi-autonomous management system, using one or more wireless networks, to control and manage UAVs in flight, in all phases of a flying plane and adaptable based on continuous feedback and ever changing conditions.

Also, in various exemplary embodiments, the present disclosure relates to air traffic control of UAVs in delivery applications, i.e., using the drones to deliver packages, etc. to end users. Specifically, an air traffic control system utilizes existing wireless networks, such as wireless networks including wireless provider networks, i.e., cell networks, using Long Term Evolution (LTE) or the like, to provide air traffic control of UAVs. Also, the cell networks can be used in combination with other networks such as the NAS network or the like. Advantageously, cell networks provide high-bandwidth connectivity, low-cost connectivity, and broad geographic coverage. The air traffic control of the UAVs can include, for example, separation assurance between UAVs; navigation assistance; weather and obstacle reporting; monitoring of speed, altitude, location, direction, etc.; traffic management; landing services; and real-time control. The UAV is equipped with a mobile device, such as an embedded mobile device or physical hardware emulating a mobile device. In an exemplary embodiment, the UAV can be equipped with hardware to support plural cell networks, to allow for broad coverage support. In another exemplary embodiment, UAV flight plans can be constrained based on the availability of wireless cell coverage. In a further exemplary embodiment, the air traffic control can use plural wireless networks for different purposes such as using the NAS network for location and traffic management and using the cell network for the other functions.

The present disclosure leverages the existing wireless networks to address various issues associated with specific UAV applications such as delivery and to address the vast number of UAVs concurrently expected in flight relative to air traffic control. In an exemplary embodiment, in addition to air traffic control, the air traffic control system also supports package delivery authorization and management, landing authorization and management, separation assurance through altitude and flying lane coordination, and the like. Thus, the air traffic control system, leveraging existing wireless networks, can also provide application specific support.

§ 1.0 Exemplary Cell Site

Referring to FIG. 1, in an exemplary embodiment, a diagram illustrates a side view of an exemplary cell site 10. The cell site 10 includes a cell tower 12. The cell tower 12 can be any type of elevated structure, such as 100-200 feet/30-60 meters tall. Generally, the cell tower 12 is an elevated structure for holding cell site components 14. The cell tower 12 may also include a lighting rod 16 and a warning light 18. Of course, there may various additional components associated with the cell tower 12 and the cell site 10 which are omitted for illustration purposes. In this exemplary embodiment, there are four sets 20, 22, 24, 26 of cell site components 14, such as for four different wireless service providers. In this example, the sets 20, 22, 24 include various antennas 30 for cellular service. The sets 20, 22, 24 are deployed in sectors, e.g. there can be three sectors for the cell site components—alpha, beta, and gamma. The antennas 30 are used to both transmit a radio signal to a mobile device and receive the signal from the mobile device. The antennas 30 are usually deployed as a single, groups of two, three or even four per sector. The higher the frequency of spectrum supported by the antenna 30, the shorter the antenna 30. For example, the antennas 30 may operate around 850 MHz, 1.9 GHz, and the like. The set 26 includes a microwave dish 32 which can be used to provide other types of wireless connectivity, besides cellular service. There may be other embodiments where the cell tower 12 is omitted and replaced with other types of elevated structures such as roofs, water tanks, etc.

§ 1.1 FAA Regulations

The FAA is overwhelmed with applications from companies interested in flying drones, but the FAA is intent on keeping the skies safe. Currently, approved exemptions for flying drones include tight rules. Once approved, there is some level of certification for drone operators along with specific rules such as speed limit of 100 mph, height limitations such as 400 ft, no-fly zones, only day operation, documentation, and restrictions on aerial filming. It is expected that these regulations will loosen as UAV deployments evolve. However, it is expected that the UAV regulations will require flight which would accommodate wireless connectivity to cell towers 12, e.g., less than a few hundred feet.

§ 2.0 Exemplary Hardware

Figure 2:
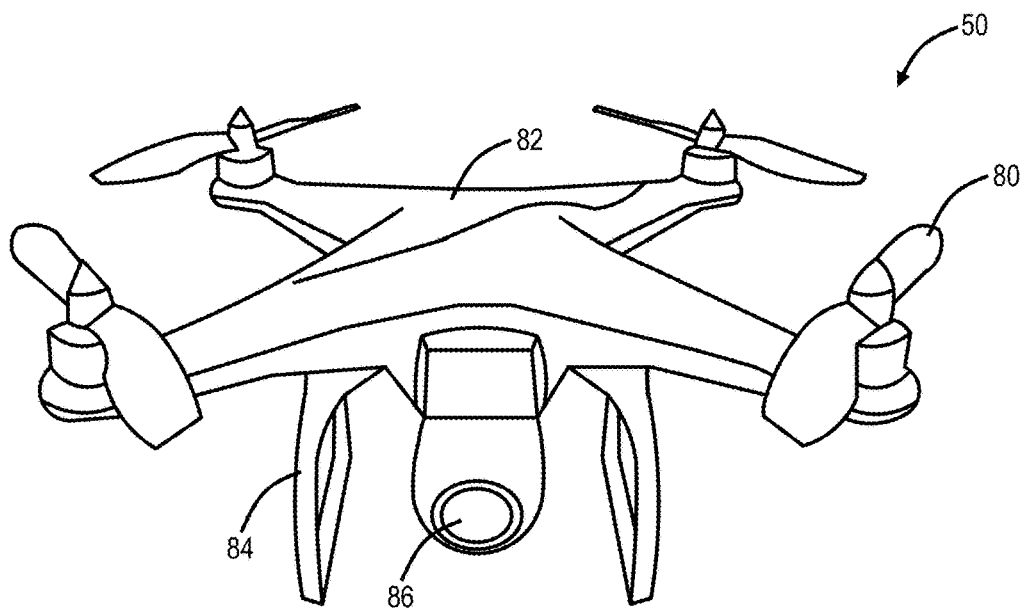
FIG. 2 is a perspective view of an exemplary UAV for use with the systems and methods described herein.

Referring to FIG. 2, in an exemplary embodiment, a perspective view illustrates an exemplary UAV 50 for use with the systems and methods described herein. Again, the UAV 50 may be referred to as a drone or the like. The UAV 50 may be a commercially available UAV platform that has been modified to carry specific electronic components as described herein to implement the various systems and methods. The UAV 50 includes rotors 80 attached to a body 82. A lower frame 84 is located on a bottom portion of the body 82, for landing the UAV 50 to rest on a flat surface and absorb impact during landing. The UAV 50 also includes a camera 86 which is used to take still photographs, video, and the like. Specifically, the camera 86 is used to provide the real-time display on the screen 62. The UAV 50 includes various electronic components inside the body 82 and/or the camera 86 such as, without limitation, a processor, a data store, memory, a wireless interface, and the like. Also, the UAV 50 can include additional hardware, such as robotic arms or the like that allow the UAV 50 to attach/detach components for the cell site components 14. Specifically, it is expected that the UAV 50 will get bigger and more advanced, capable of carrying significant loads, and not just a wireless camera.

These various components are now described with reference to a mobile device 100 or a processing device 100. Those of ordinary skill in the art will recognize the UAV 50 can include similar components to the mobile device 100. In an exemplary embodiment, the UAV 50 can include one or more mobile devices 100 embedded therein, such as for different cell networks. In another exemplary embodiment, the UAV 50 can include hardware which emulates the mobile device 100 including support for multiple different cell networks. For example, the hardware can include multiple different antennas and unique identifier configurations (e.g., Subscriber Identification Module (SIM) cards). For example, the UAV 50 can include circuitry to communicate with one or more LTE networks with an associated unique identifier, e.g., serial number.

Figure 3:
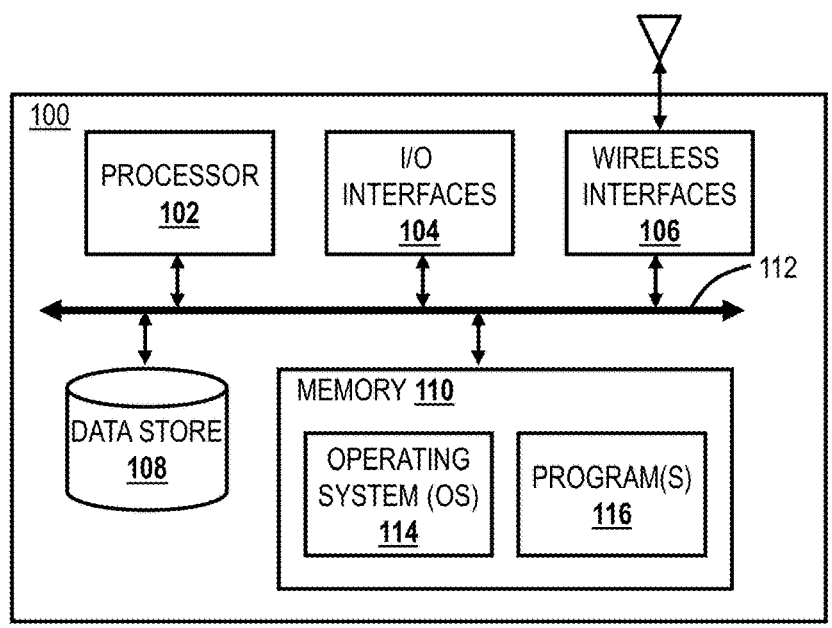
FIG. 3 is a block diagram of a mobile device, which may be embedded or associated with the UAV of FIG. 1.

Referring to FIG. 3, in an exemplary embodiment, a block diagram illustrates a mobile device 100 hardware, which may be embedded or associated with the UAV 50. The mobile device 100 can be a digital device that, in terms of hardware architecture, generally includes a processor 102, input/output (I/O) interfaces 104, wireless interfaces 106, a data store 108, and memory 110. It should be appreciated by those of ordinary skill in the art that FIG. 3 depicts the mobile device 100 in an oversimplified manner, and a practical embodiment may include additional components and suitably configured processing logic to support known or conventional operating features that are not described in detail herein. The components (102, 104, 106, 108, and 102) are communicatively coupled via a local interface 112. The local interface 112 can be, for example, but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the mobile device 100, a semiconductor-based microprocessor (in the form of a microchip or chip set), or generally any device for executing software instructions. When the mobile device 100 is in operation, the processor 102 is configured to execute software stored within the memory 110, to communicate data to and from the memory 110, and to generally control operations of the mobile device 100 pursuant to the software instructions. In an exemplary embodiment, the processor 102 may include a mobile-optimized processor such as optimized for power consumption and mobile applications. The I/O interfaces 104 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 104 can also include, for example, a serial port, a parallel port, a small computer system interface (SCSI), an infrared (IR) interface, a radio frequency (RF) interface, a universal serial bus (USB) interface, and the like. The I/O interfaces 104 can include a graphical user interface (GUI) that enables a user to interact with the mobile device 100. Additionally, the I/O interfaces 104 may further include an imaging device, i.e. camera, video camera, etc.

The wireless interfaces 106 enable wireless communication to an external access device or network. Any number of suitable wireless data communication protocols, techniques, or methodologies can be supported by the wireless interfaces 106, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The wireless interfaces 106 can be used to communicate with the UAV 50 for command and control as well as to relay data. Again, the wireless interfaces 106 can be configured to communicate on a specific cell network or on a plurality of cell networks. The wireless interfaces 106 include hardware, wireless antennas, etc. enabling the UAV 50 to communicate concurrently with a plurality of wireless networks, such as cellular networks, GPS, GLONASS, WLAN, WiMAX, or the like.

The data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. The memory 110 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 110 may incorporate electronic, magnetic, optical, and/or other types of storage media. Note that the memory 110 may have a distributed architecture, where various components are situated remotely from one another, but can be accessed by the processor 102. The software in memory 110 can include one or more software programs, each of which includes an ordered listing of executable instructions for implementing logical functions. In the example of FIG. 3, the software in the memory 110 includes a suitable operating system (O/S) 114 and programs 116. The operating system 114 essentially controls the execution of other computer programs and provides scheduling, input-output control, file and data management, memory management, and communication control and related services. The programs 116 may include various applications, add-ons, etc. configured to provide end user functionality with the mobile device 100, including performing various aspects of the systems and methods described herein.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

§ 3.0 Exemplary Server

Figure 4:
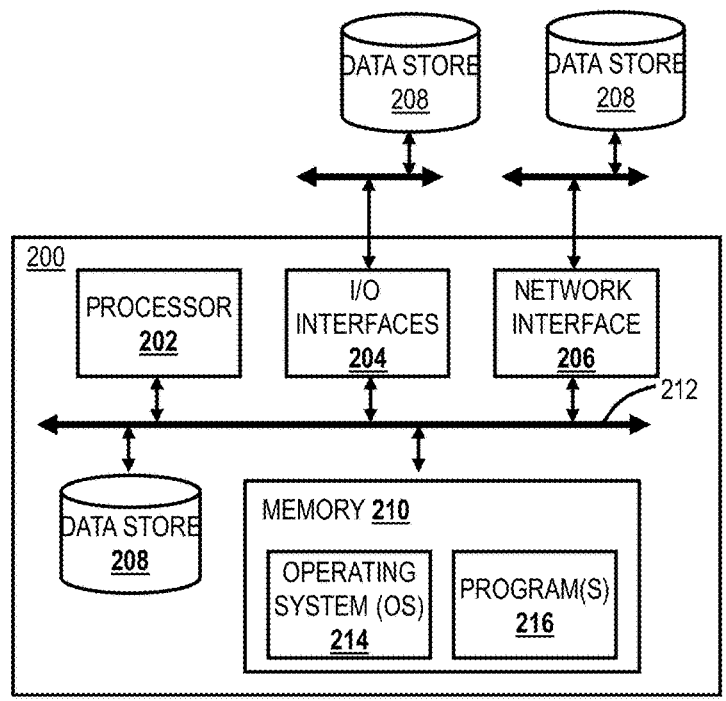
FIG. 4 is a network diagram of various cell sites deployed in a geographic region.

Referring to FIG. 4, in an exemplary embodiment, a block diagram illustrates a server 200 which may be used for air traffic control of the UAVs 50. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 200 to communicate over a network, such as to a plurality of UAVs 50 over a cell network or the like. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 4.0 UAV Air Traffic Control system

Figure 5:
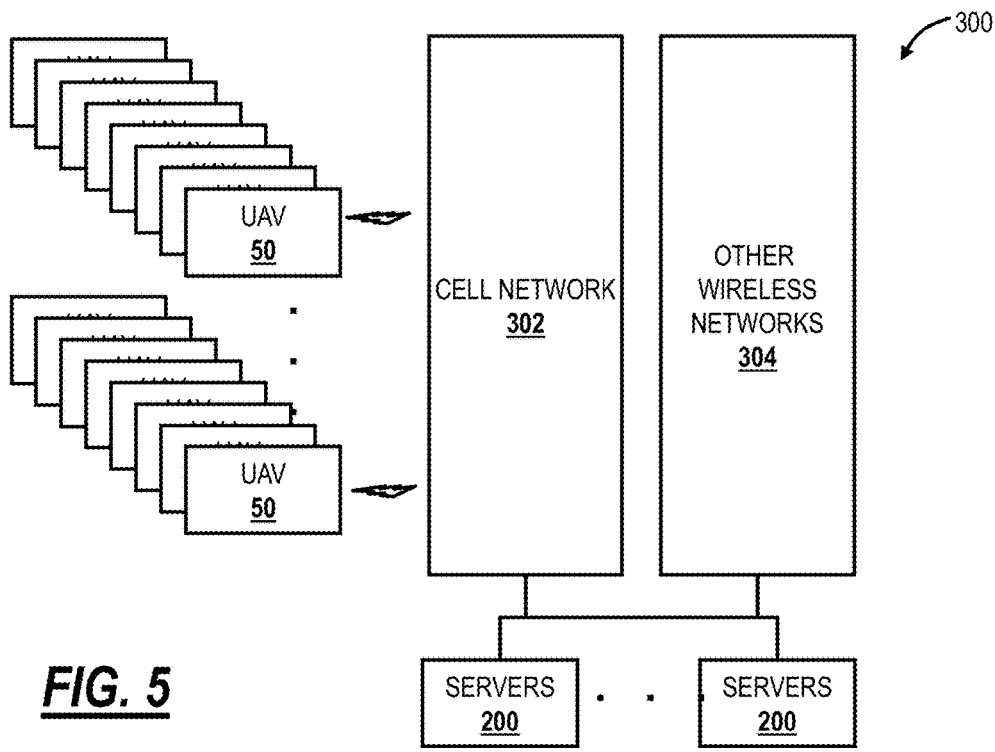
FIG. 5 is a block diagram of functional components of a UAV air traffic control system.

Referring to FIG. 5, in an exemplary embodiment, a block diagram illustrates functional components of a UAV air traffic control system 300. The UAV air traffic control system 300 includes a cell network 302 and optionally other wireless networks 304 communicatively coupled to one of more servers 200 and to a plurality of UAVs 50. The cell network 302 can actually include a plurality of different provider networks, such as AT&T, Verizon, Sprint, etc. The cell network 302 is formed in part with a plurality of cell towers 12, geographically dispersed and covering the vast majority of the United States. The cell towers 12 are configured to backhaul communications from subscribers. In the UAV air traffic control system 300, the subscribers are the UAVs 50 (in addition to conventional mobile devices) and the communications is between the UAVs 50 and the servers 200. The other wireless networks 304 can include, for example, the NAS network, GPS and/or GLONASS, WLAN networks, private wireless networks, or any other wireless networks.

The servers 200 are configured to provide air traffic control and can be deployed in a control center, at a customer premises, in the cloud, or the like. Generally, the servers 200 are configured to receive communications from the UAVs 50 such as for continuous monitoring and of relevant details of each UAV 50 such as location, altitude, speed, direction, function, etc. The servers 200 are further configured to transmit communications to the UAVs 50 such as for control based on the details, such as to prevent collisions, to enforce policies, to provide navigational control, to actually fly the UAVs 50, to land the UAVs 50, and the like. That is, generally, communications from the UAV 50 to the server 200 are for detailed monitoring and communications to the UAV 50 from the server 200 are for control thereof.

§ 4.1 Data Management

Each UAV 50 is configured with a unique identifier, such as an SIM card or the like. Similar to standard mobile devices 100, each UAV 50 is configured to maintain an association with a plurality of cell towers 12 based on a current geographic location. Using triangulation or other location identification techniques (GPS, GLONASS, etc.), the location, altitude, speed, and direction of each UAV 50 can be continuously monitored and reported back to the servers 200. The servers 200 can implement techniques to manage this data in real-time in an automated fashion to track and control all UAVs 50 in a geographic region. For example, the servers 200 can manage and store the data in the data store 208.

§ 4.2 Air Traffic Control Functions

The servers 200 are configured to perform air traffic control functionality of the UAV air traffic control system 300. Specifically, the servers 200 are configured to perform separation assurance, navigation, traffic management, landing, and general control of the UAVs 50. The separation assurance includes tracking all of the UAVs 50 in flight, based on the monitored data, to ensure adequate separation. The navigation includes maintaining defined airways. The traffic management includes comparing flights plan of UAVs 50 to avoid conflicts and to ensure the smooth and efficient flow of UAVs 50 in flight. The landing includes assisting and control of UAVs 50 at the end of their flight. The general control includes providing real-time data including video and other monitored data and allowing control of the UAV 50 in flight. The general control can also include automated flight of the UAVs 50 through the UAV air traffic control system 300, such as for autonomous UAVs. Generally, the UAV air traffic control system 300 can include routing and algorithms for autonomous operation of the UAVs 50 based on initial flight parameters. The UAV air traffic control system 300 can control speed, flight path, and altitude for a vast number of UAVs 50 simultaneously.

§ 5.0 UAV Flight Plans

Figure 6:
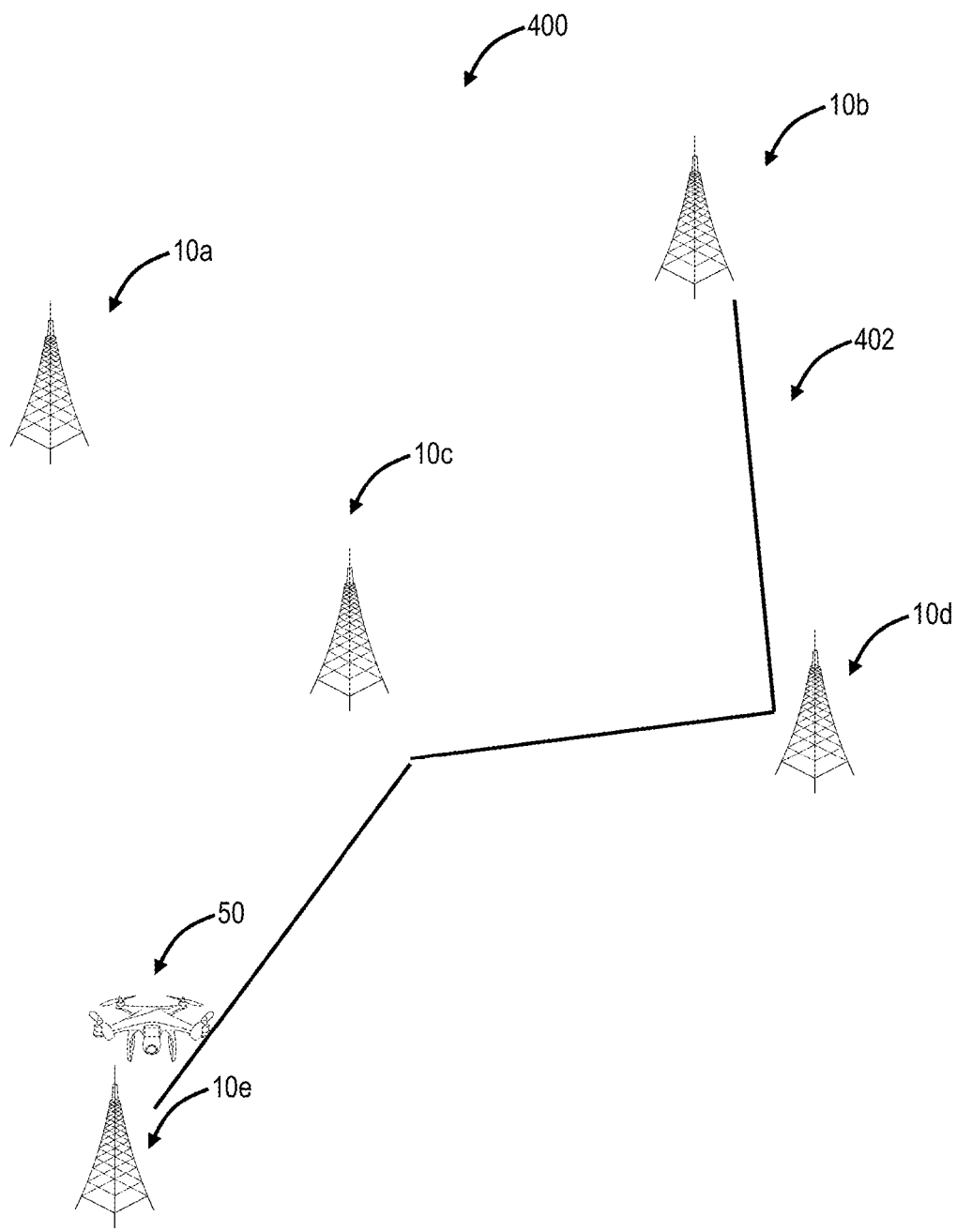
FIG. 6 is a diagram of various cell sites deployed in a geographic region.

Referring to FIG. 6, in an exemplary embodiment, a network diagram illustrates various cell sites 10*a*-10*e* deployed in a geographic region 400. In an exemplary embodiment, the UAV 50 is configured to fly a flight plan 402 in the geographic region 400 while maintaining associations with multiple cell sites 10*a*-10*e* during the flight plan 402. In an exemplary embodiment, the UAV 50 is constrained only to fly in the geographic region 400 where it has cell coverage. This constraint can be preprogrammed based on predetermining cell coverage. Alternatively, the constraint can be dynamically managed by the UAV 50 based on monitoring its cell signal level in the mobile device 100 hardware. Here, the UAV 50 will alter its path whenever it loses or detects signal degradation to ensure it is always active on the cell network 302. During the flight plan 402, the cell sites 10*a*-10*e* are configured to report monitored data to the servers 200 periodically to enable real-time air traffic control. Thus, the communication between the UAVs 50 is bi-directional with the servers 200, through the associated cell sites 10.

In an exemplary embodiment, the UAV 50 maintains an association with at least three of the cell sites 10 which perform triangulation to determine the location of the UAV 50. In addition to the cell sites 10 on the cell network 302, the UAV 50 can also communicate to the other wireless networks 304. In an exemplary embodiment, the UAV 50 can maintain its GPS and/or GLONASS location and report that over the cell network 302. In another exemplary embodiment, the other wireless networks 304 can include satellite networks or the like.

§ 5.1 Triangulation

Figure 7:
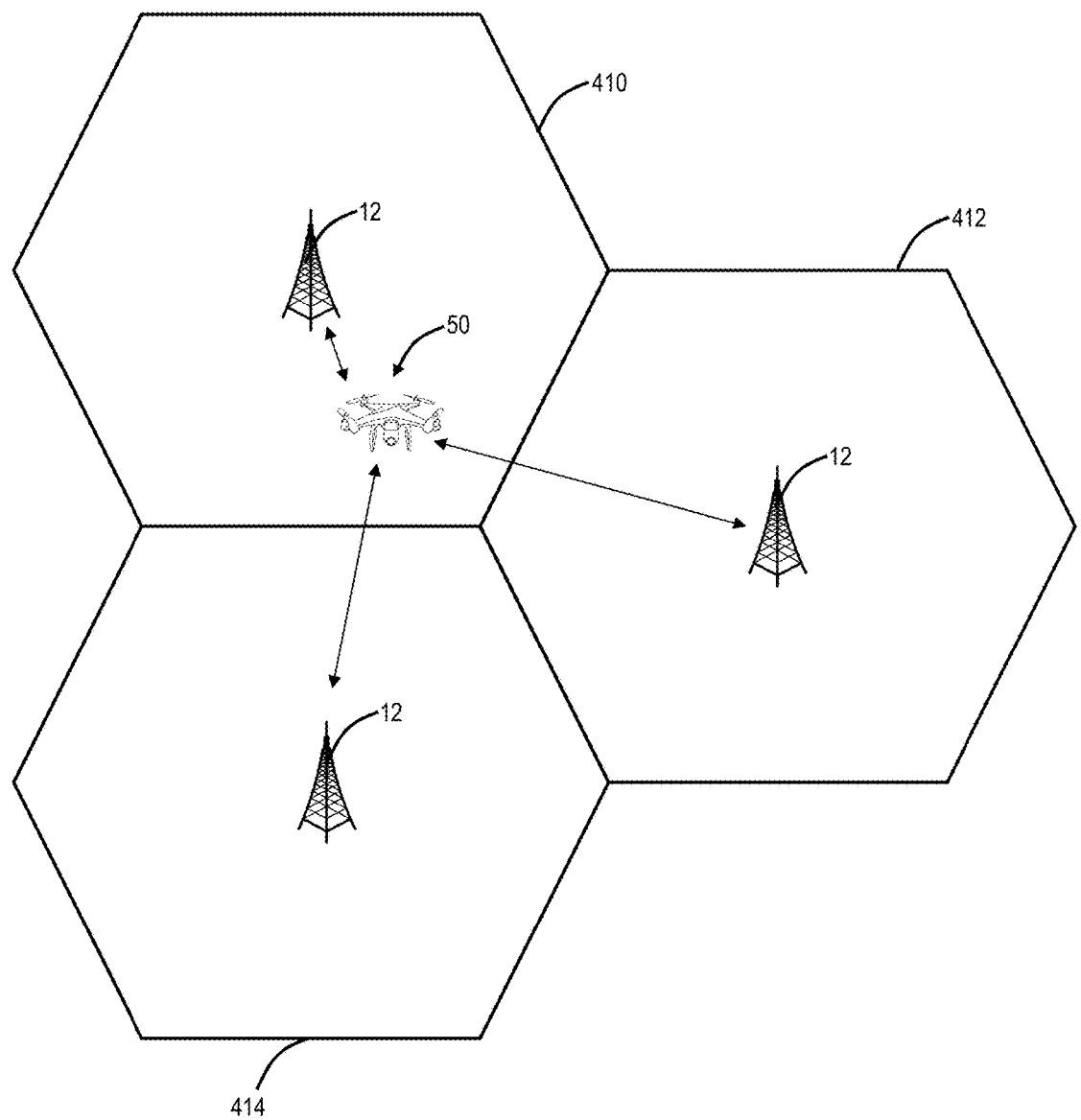
FIG. 7 is a map of three cell towers and associated coverage areas for describing location determination of the UAV.

Referring to FIG. 7, in an exemplary embodiment, a map illustrates three cell towers 12 and associated coverage areas 410, 412, 414 for describing location determination of the UAV 50. Typically, for a cell site 10, in rural locations, the coverage areas 410, 412, 414 can be about 5 miles in radius whereas, in urban locations, the coverage areas 410, 412, 414 can be about 0.5 to 2 miles in radius. One aspect of the UAV air traffic control system 300 is to maintain a precise location at all time of the UAVs 50. This can be accomplished in a plurality of ways, including a combination. The UAV air traffic control system 300 can use triangulation based on the multiple cell towers 12, location identifiers from GPS/GLONASS transmitted over the cell network 402 by the UAVs 50, sensors in the UAV 50 for determining altitude, speed, etc., and the like.

§ 6.0 UAV Air Traffic Control Method Utilizing Wireless Networks

Figure 8:
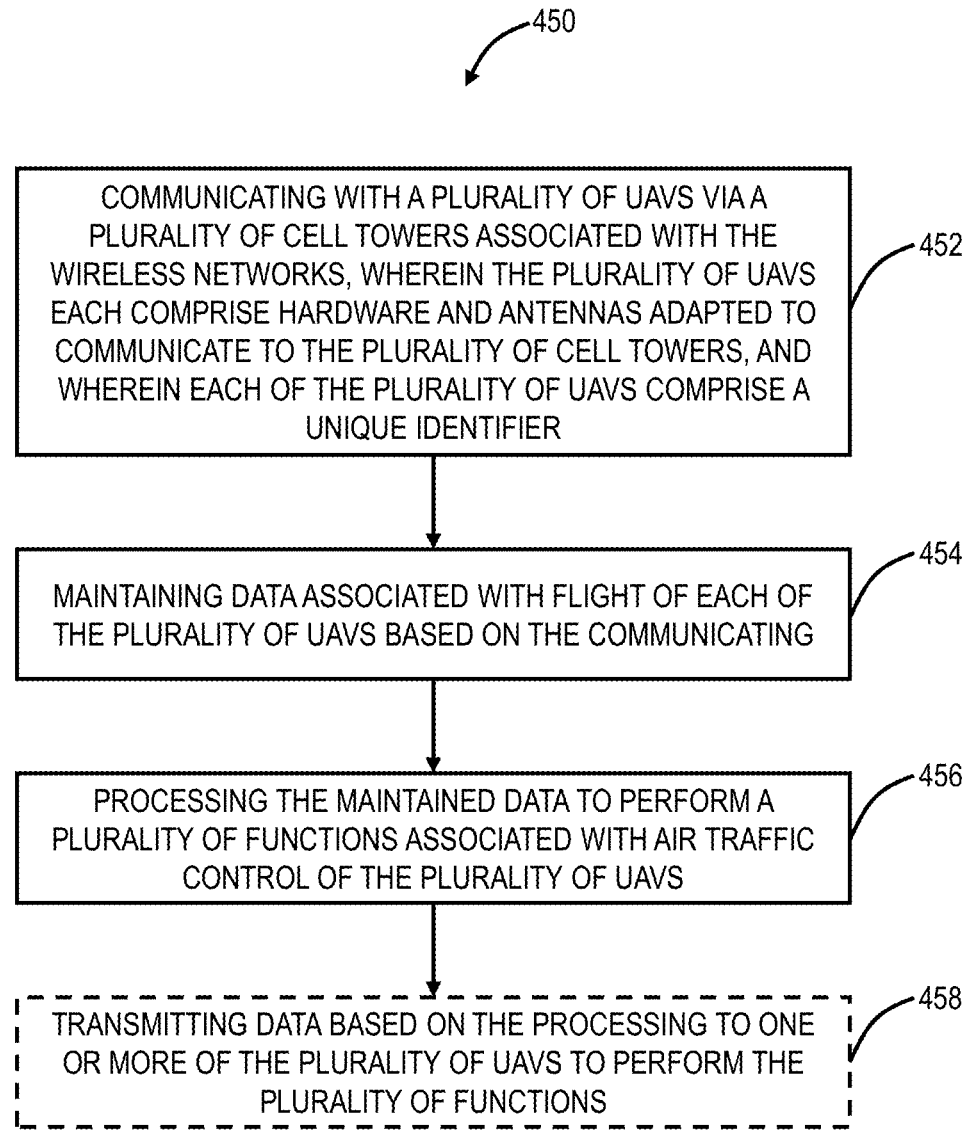
FIG. 8 is a flowchart of a UAV air traffic control method utilizing wireless networks.

Referring to FIG. 8, in an exemplary embodiment, a flowchart illustrates a UAV air traffic control method 450 utilizing wireless networks. The UAV air traffic control method 450 includes communicating with a plurality of UAVs via a plurality of cell towers associated with the wireless networks, wherein the plurality of UAVs each include hardware and antennas adapted to communicate to the plurality of cell towers, and wherein each of the plurality of UAVs include a unique identifier (step 452); maintaining data associated with flight of each of the plurality of UAVs based on the communicating (step 454); and processing the maintained data to perform a plurality of functions associated with air traffic control of the plurality of UAVs (step 456). The UAV-based method 450 can further include transmitting data based on the processing to one or more of the plurality of UAVs to perform the plurality of functions (step 458). The plurality of UAVs can be configured to constrain flight based on coverage of the plurality of cell towers. The constrained flight can include one or more of pre-configuring the plurality of UAVs to operate only where the coverage exists, monitoring cell signal strength by the plurality of UAVs and adjusting flight based therein, and a combination thereof.

The maintaining data can include the plurality of UAVs and/or the plurality of cell towers providing location, speed, direction, and altitude. The location can be determined based on a combination of triangulation by the plurality of cell towers and a determination by the UAV based on a location identification network. The plurality of function can include one or more of separation assurance between UAVs; navigation assistance; weather and obstacle reporting; monitoring of speed, altitude, location, and direction; traffic management; landing services; and real-time control. One or more of the plurality of UAVs can be configured for autonomous operation through the air traffic control. The plurality of UAVs can be configured with mobile device hardware configured to operate on a plurality of different cell networks.

Figure 9:
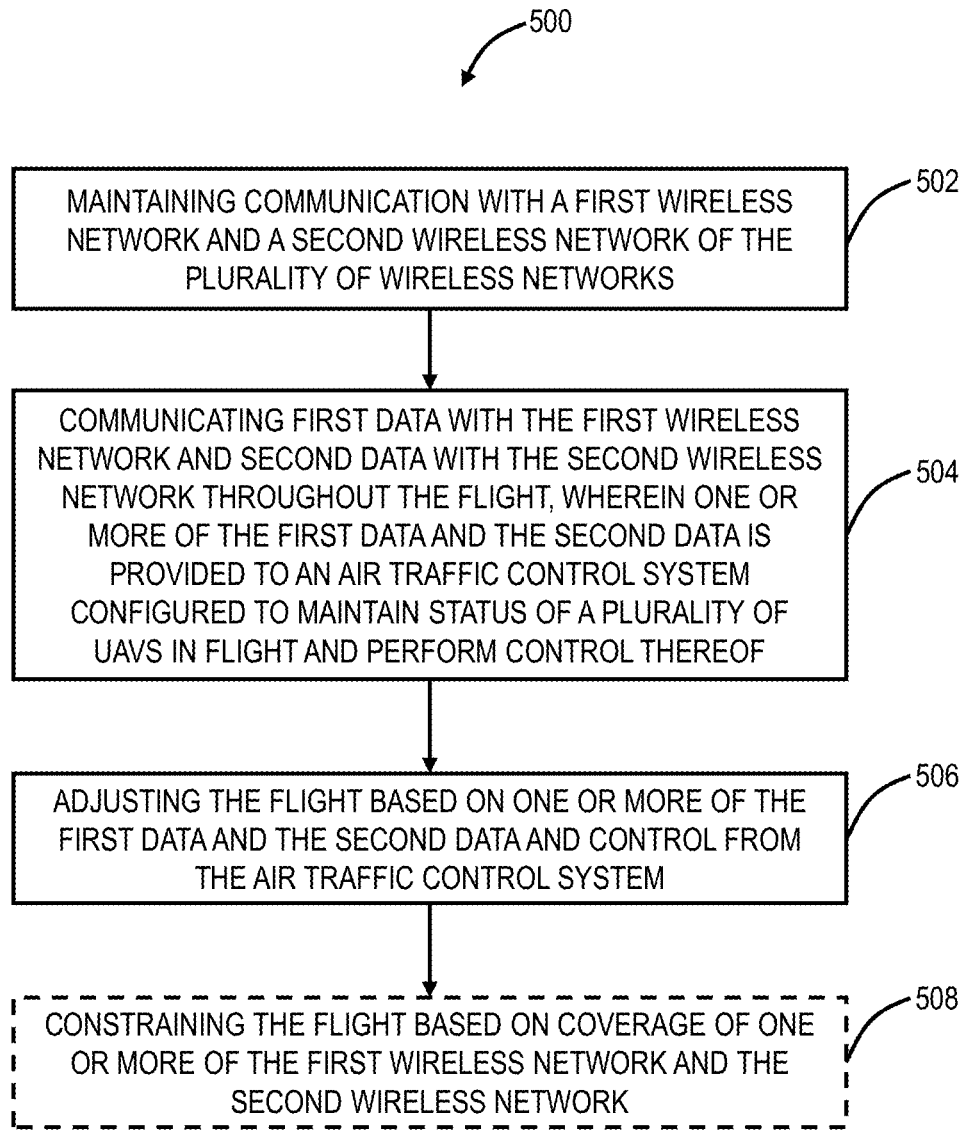
FIG. 9 is a flowchart of a UAV air traffic control method concurrently utilizing a plurality of wireless networks.

§ 7.0 UAV Air Traffic Control Method Concurrently Utilizing a Plurality of Wireless Networks Referring to FIG. 9, in an exemplary embodiment, a flowchart illustrates an Unmanned Aerial Vehicle (UAV) air traffic control method 500 implemented in the UAV 50 during a flight, for concurrently utilizing a plurality wireless networks for air traffic control. The UAV air traffic control method 500 includes maintaining communication with a first wireless network and a second wireless network of the plurality of wireless networks (step 502); communicating first data with the first wireless network and second data with the second wireless network throughout the flight, wherein one or more of the first data and the second data is provided to an air traffic control system configured to maintain status of a plurality of UAVs in flight and perform control thereof (step 504); and adjusting the flight based on one or more of the first data and the second data and control from the air traffic control system (step 506). The first wireless network can provide bidirectional communication between the UAV and the air traffic control system and the second wireless network can support unidirectional communication to the UAV for status indications. The first wireless network can include one or more cellular networks and the second wireless network can include a location identification network. Both the first wireless network and the second wireless network can provide bidirectional communication between the UAV and the air traffic control system for redundancy with one of the first wireless network and the second wireless network operating as primary and another as backup. The first wireless network can provide bidirectional communication between the UAV and the air traffic control system and the second wireless network can support unidirectional communication from the UAV for status indications.

The UAV air traffic control method can further include constraining the flight based on coverage of one or more of the first wireless network and the second wireless network (step 508). The constrained flight can include one or more of pre-configuring the UAV to operate only where the coverage exists, monitoring cell signal strength by the UAV and adjusting flight based therein, and a combination thereof. The first data can include location, speed, direction, and altitude for reporting to the air traffic control system. The control from the air traffic control system can include a plurality of functions comprising one or more of separation assurance between UAVs; navigation assistance; weather and obstacle reporting; monitoring of speed, altitude, location, and direction; traffic management; landing services; and real-time control. The UAV can be configured for autonomous operation through the air traffic control system.

In another exemplary embodiment, an Unmanned Aerial Vehicle (UAV) adapted for air traffic control via an air traffic control system and via communication to a plurality of wireless networks includes one or more rotors disposed to a body; wireless interfaces including hardware and antennas adapted to communicate with a first wireless network and a second wireless network of the plurality of wireless networks, and wherein the UAV comprises a unique identifier; a processor coupled to the wireless interfaces and the one or more rotors; and memory storing instructions that, when executed, cause the processor to: maintain communication with the first wireless network and the second wireless network via the wireless interfaces; communicate first data with the first wireless network and second data with the second wireless network throughout the flight, wherein one or more of the first data and the second data is provided to an air traffic control system configured to maintain status of a plurality of UAVs in flight and perform control thereof; and adjust the flight based on one or more of the first data and the second data and control from the air traffic control system. The first wireless network can provide bidirectional communication between the UAV and the air traffic control system and the second wireless network can support unidirectional communication to the UAV for status indications. The first wireless network can include one or more cellular networks and the second wireless network can include a location identification network. Both the first wireless network and the second wireless network can provide bidirectional communication between the UAV and the air traffic control system for redundancy with one of the first wireless network and the second wireless network operating as primary and another as backup.

The first wireless network can provide bidirectional communication between the UAV and the air traffic control system and the second wireless network can support unidirectional communication from the UAV for status indications. The UAV can be configured to constrain the flight based on coverage of one or more of the first wireless network and the second wireless network. The constrained flight can include one or more of pre-configuring the UAV to operate only where the coverage exists, monitoring cell signal strength by the UAV and adjusting flight based therein, and a combination thereof. The first data can include location, speed, direction, and altitude for reporting to the air traffic control system. The control from the air traffic control system can include a plurality of functions comprising one or more of separation assurance between UAVs; navigation assistance; weather and obstacle reporting; monitoring of speed, altitude, location, and direction; traffic management; landing services; and real-time control. The UAV can be configured for autonomous operation through the air traffic control system.

§ 8.0 Package Delivery Authorization and Management

Figure 10:
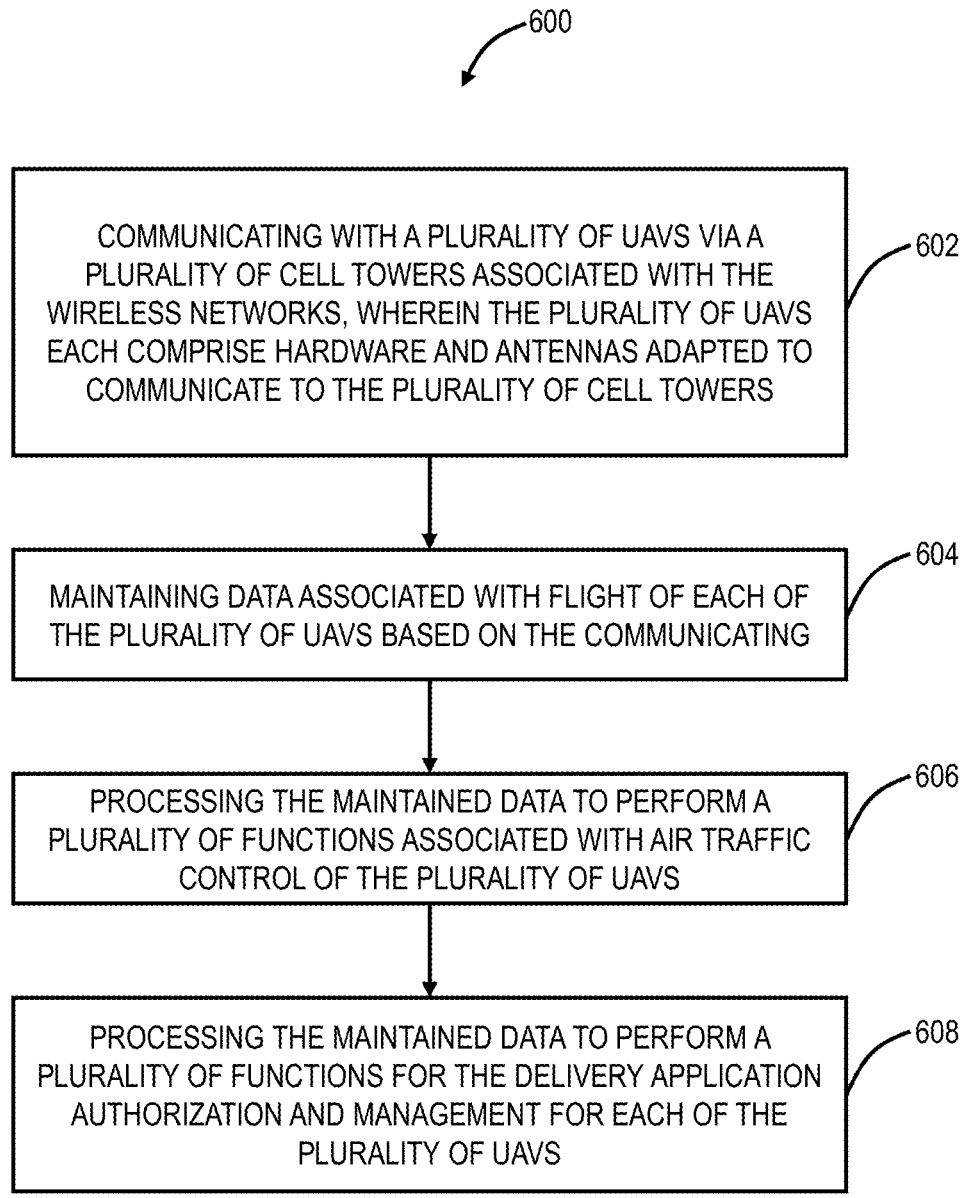
FIG. 10 is a flowchart of a packet delivery authorization and management method utilizing the UAV air traffic control system of FIG. 5.

Referring to FIG. 10, in an exemplary embodiment, a flowchart illustrates a packet delivery authorization and management method 600 utilizing the UAV air traffic control system 300. The method 600 includes communicating with a plurality of UAVs via a plurality of cell towers associated with the wireless networks, wherein the plurality of UAVs each comprise hardware and antennas adapted to communicate to the plurality of cell towers (step 602); maintaining data associated with flight of each of the plurality of UAVs based on the communicating (step 604); processing the maintained data to perform a plurality of functions associated with air traffic control of the plurality of UAVs (step 606); and processing the maintained data to perform a plurality of functions for the delivery application authorization and management for each of the plurality of UAVs (step 608). The maintained data can include location information received and updated periodically from each of the plurality of UAVs, and wherein the location information is correlated to coordinates and altitude. The location information can be determined based on a combination of triangulation by the plurality of cell towers and a determination by the UAV based on a location identification network. The processing for the delivery application authorization and management can include checking the coordinates and the altitude based on a flight plan, for each of the plurality of UAVs. The checking the coordinates and the altitude can further include assuring each of the plurality of UAVs is in a specified flying lane.

The maintained data can include current battery and/or fuel status for each of the plurality of UAVs, and wherein the processing for the delivery application authorization and management can include checking the current battery and/or fuel status to ensure sufficiency to provide a current delivery, for each of the plurality of UAVs. The maintained data can include photographs and/or video of a delivery location, and wherein the processing for the delivery application authorization and management can include checking the delivery location is clear for landing and/or dropping a package, for each of the plurality of UAVs. The maintained data can include photographs and/or video of a delivery location, and wherein the processing for the delivery application authorization and management comprises, for each of the plurality of UAVs, checking the delivery location for a delivery technique including one of landing, dropping via a tether, dropping to a doorstep, dropping to a mailbox, dropping to a porch, and dropping to a garage. The plurality of UAVs can be configured to constrain flight based on coverage of the plurality of cell towers. The constrained flight can include one or more of pre-configuring the plurality of UAVs to operate only where the coverage exists, monitoring cell signal strength by the plurality of UAVs and adjusting flight based therein, and a combination thereof.

§ 8.1 Package Delivery Authorization and Management via the Air Traffic Control System In another exemplary embodiment, the air traffic control system 300 utilizing wireless networks and concurrently supporting delivery application authorization and management includes the processor and the network interface communicatively coupled to one another; and the memory storing instructions that, when executed, cause the processor to: communicate, via the network interface, with a plurality of UAVs via a plurality of cell towers associated with the wireless networks, wherein the plurality of UAVs each include hardware and antennas adapted to communicate to the plurality of cell towers; maintain data associated with flight of each of the plurality of UAVs based on the communicating; process the maintained data to perform a plurality of functions associated with air traffic control of the plurality of UAVs; and process the maintained data to perform a plurality of functions for the delivery application authorization and management for each of the plurality of UAVs.

§ 8.2 Landing Authorization and Management

In another exemplary aspect, the air traffic control system 300 can be configured to provide landing authorization and management in addition to the aforementioned air traffic control functions and package delivery authorization and management. The landing authorization and management can be at the home base of the UAV, at a delivery location, and/or at a pickup location. The air traffic control system 300 can control and approve the landing. For example, the air traffic control system 300 can receive photographs and/or video from the UAV 50 of the location (home base, delivery location, pickup location). The air traffic control system 300 can make a determination based on the photographs and/or video, as well as other parameters such as wind speed, temperature, etc. to approve the landing.

§ 9.0 Separation Assurance via the Air Traffic Control System

In another exemplary aspect, the air traffic control system 300 can be used to for separation assurance through altitude and flying lane coordination in addition to the aforementioned air traffic control functions, package delivery authorization and management, landing authorization and management, etc. As the air traffic control system 300 has monitored data from various UAVs 50, the air traffic control system 300 can keep track of specific flight plans as well as cause changes in real time to ensure specific altitude and vector headings, i.e., a flight lane. For example, the air traffic control system 300 can include a specific geography of interest and there can be adjacent air traffic control systems 300 that communicate to one another and share some overlap in the geography for handoffs. The air traffic control systems 300 can make assumptions on future flight behavior based on the current data and then direct UAVs 50 based thereon. The air traffic control system 300 can also communicate with commercial aviation air traffic control systems for limited data exchange to ensure the UAVs 50 do not interfere with commercial aircraft or fly in no-fly zones.

§ 10.0 Flying Lane Management

Figure 11:
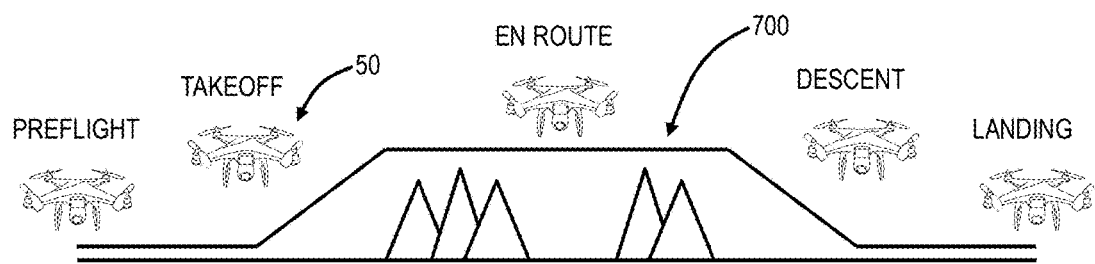
FIG. 11 is a diagram of a flight path of an associated flying lane of a UAV from takeoff to landing.

Referring to FIG. 11, in an exemplary embodiment, a diagram illustrates a flight path of an associated flying lane 700 of a UAV 50 from takeoff to landing. The flying lane 700 covers all flight phases which include preflight, takeoff, en route, descent, and landing. Again, the flying lane 700 includes coordinates (e.g., GPS, etc.), altitude, speed, and heading at a specified time. As described herein, the UAV 50 is configured to communicate to the air traffic control system 300, during all of the flight phases, such as via the networks 302, 304. The air traffic control system 300 is configured to monitor and manage/control the flying lane 700 as described herein. The objective of this management is to avoid collisions, avoid obstructions, avoid flight in restricted areas or areas with no network 302, 304 coverage, etc.

During preflight, the UAV 50 is configured to communicate with the air traffic control system 300 for approvals (e.g., flight plan, destination, the flying lane 700, etc.) and notification thereof, for verification (e.g., weather, delivery authorization, etc.), and the like. The key aspect of the communication during the preflight is for the air traffic control system 300 to become aware of the flying lane 700, to ensure it is open, and to approve the UAV 50 for takeoff. Other aspects of the preflight can include the air traffic control system 300 coordinating the delivery, coordinating with other systems, etc. Based on the communication from the UAV 50 (as well as an operator, scheduler, etc.), the air traffic control system 300 can perform processing to make sure the flying lane 700 is available and if not, to adjust accordingly.

During takeoff, the UAV 50 is configured to communicate with the air traffic control system 300 for providing feedback from the UAV 50 to the air traffic control system 300. Here, the air traffic control system 300 can store and process the feedback to keep up to date with the current situation in airspace under control, for planning other flying lanes 700, etc. The feedback can include speed, altitude, heading, etc. as well as other pertinent data such as location (e.g., GPS, etc.), temperature, humidity, the wind, and any detected obstructions during takeoff. The detected obstructions can be managed by the air traffic control system 300 as described herein, i.e., temporary obstructions, permanent obstructions, etc.

Once airborne, the UAV is en route to the destination and the air traffic control system 300 is configured to communicate with the air traffic control system 300 for providing feedback from the UAV 50 to the air traffic control system 300. Similar to takeoff, the communication can include the same feedback. Also, the communication can include an update to the flying lane 700 based on current conditions, changes, etc. A key aspect is the UAV 50 is continually in data communication with the air traffic control system 300 via the networks 302, 304.

As the destination is approached, the air traffic control system 300 can authorize/instruct the UAV 50 to begin the descent. Alternatively, the air traffic control system 300 can pre-authorize based on reaching a set point. Similar to takeoff and en route, the communication in the descent can include the same feedback. The feedback can also include information about the landing spot as well as processing by the air traffic control system 300 to change any aspects of the landing based on the feedback. Note, the landing can include a physical landing or hovering and releasing cargo.

In various embodiments, the air traffic control system 300 is expected to operate autonomously or semi-autonomously, i.e., there is not a live human operator monitoring each UAV 50 flight. This is an important distinction between conventional air traffic control for aircraft and the air traffic control system 300 for UAVs 50. Specifically, it would not be feasible to manage UAVs 50 with live operators. Accordingly, the air traffic control system 300 is configured to communicate and manage during all flight phases with a large quantity of UAVs 50 concurrently in an automated manner.

In an exemplary embodiment, the objective of the flying lane management through the air traffic control system 300 is to manage deliveries efficiently while secondarily to ensure collision avoidance. Again, this aspect is different from conventional air traffic control which focuses first and foremost of collision avoidance. This is not to say that collision avoidance is minimized, but rather it is less important since the UAVs 50 can themselves maintain a buffer from one another based on the in-flight detection. To achieve the management, the air traffic control system 300 can implement various routing techniques to allows the UAVs 50 to use associated flying lanes 700 to arrive and deliver packages. Thus, one aspect of flying lane management, especially for delivery applications, is efficiency since efficient routing can save time, fuel, etc. which is key for deliveries.

Figure 12:
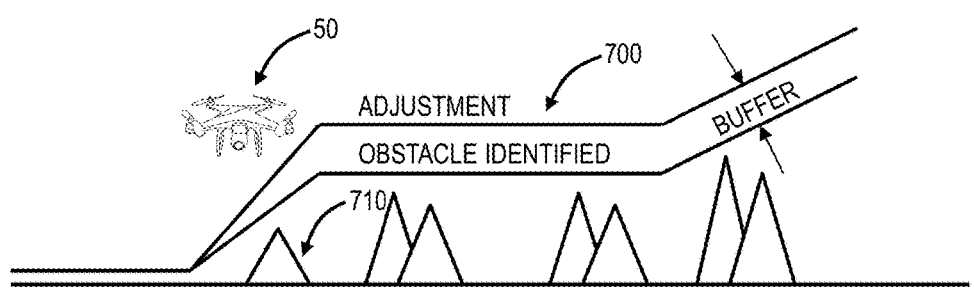
FIG. 12 is a diagram of obstruction detection by the UAV and associated changes to the flying lane.

Referring to FIG. 12, in an exemplary embodiment, a diagram illustrates obstruction detection by the UAV 50 and associated changes to the flying lane 700. One aspect of flying lane management is detected obstruction management. Here, the UAV 50 has taken off, have the flying lane 700, and is in communication with the air traffic control system 300. During the flight, either the UAV 50 detects an obstacle 710 or the air traffic control system 300 is notified from another source of the obstacle 710 and alerts the UAV 50. Again, the UAVs 50 are flying at lower altitudes, and the obstacle 710 can be virtually anything that is temporary such as a crane, a vehicle, etc. or that is permanent such as a building, tree, etc. The UAV 50 is configured, with assistance and control from the air traffic control system 300 to adjust the flying lane 700 to overcome the obstacle 710 as well as add a buffer amount, such as 35 feet or any other amount for safety.

Figure 13:
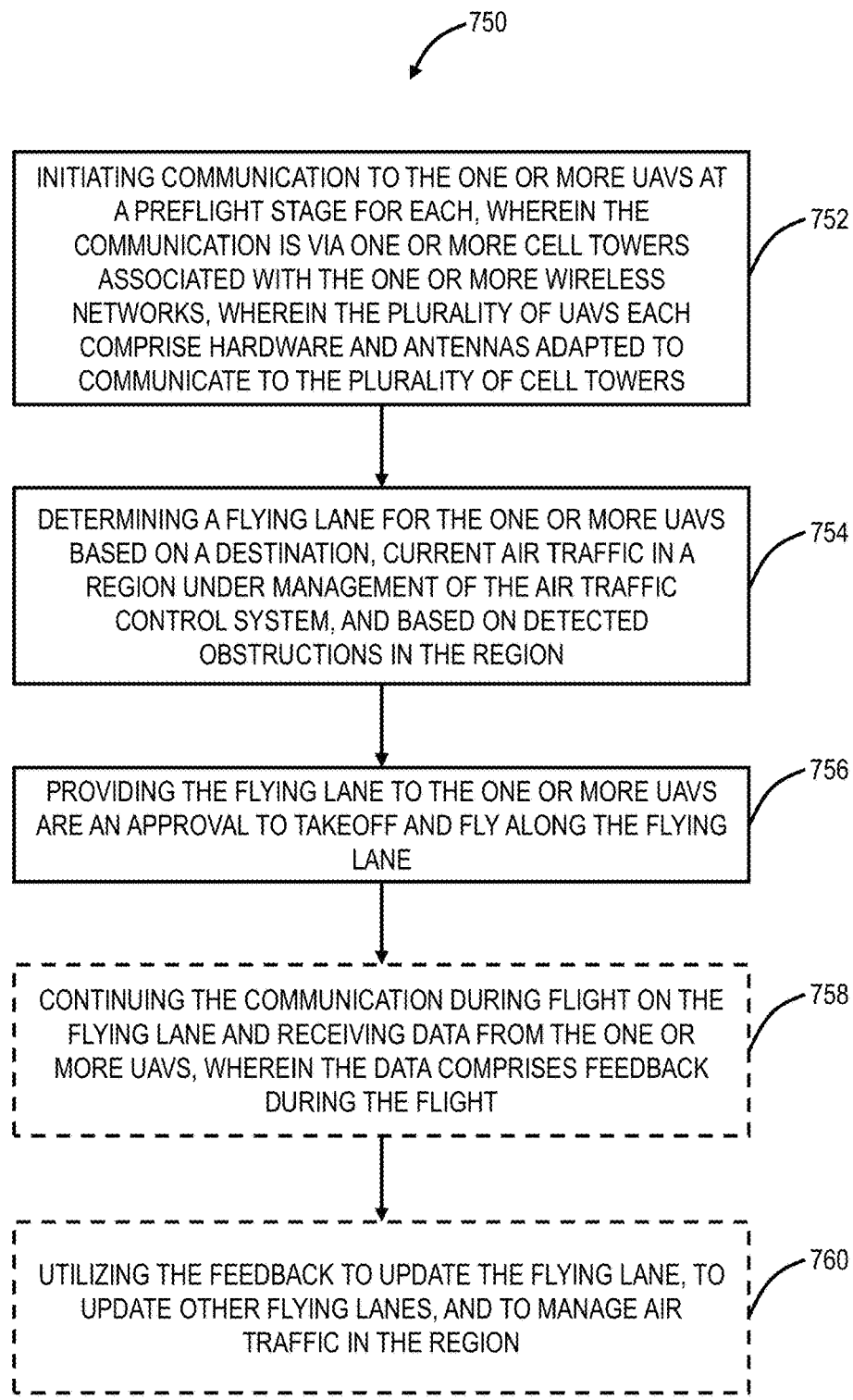
FIG. 13 is a flowchart of a flying lane management method via an air traffic control system communicatively coupled to a UAV via one or more wireless networks.

Referring to FIG. 13, in an exemplary embodiment, a flowchart illustrates a flying lane management method 750 via an air traffic control system communicatively coupled to a UAV via one or more wireless networks. In an exemplary embodiment, the flying lane management method 750 includes initiating communication to the one or more UAVs at a preflight stage for each, wherein the communication is via one or more cell towers associated with the one or more wireless networks, wherein the plurality of UAVs each include hardware and antennas adapted to communicate to the plurality of cell towers (step 752); determining a flying lane for the one or more UAVs based on a destination, current air traffic in a region under management of the air traffic control system, and based on detected obstructions in the region (step 754); and providing the flying lane to the one or more UAVs are an approval to takeoff and fly along the flying lane (step 756). The flying lane management method 750 can further include continuing the communication during flight on the flying lane and receiving data from the one or more UAVs, wherein the data includes feedback during the flight (step 758); and utilizing the feedback to update the flying lane, to update other flying lanes, and to manage air traffic in the region (step 760). During the flight, the feedback includes speed, altitude, and heading, and the feedback can further include one or more of temperature, humidity, wind, and detected obstructions.

The flying lane management method 750 can further include providing updates to the flying lane based on the feedback and based on feedback from other devices. The flying lane management method 750 can further include, based on the feedback, determining the one or more UAVs at ready to descend or fly to the destination and providing authorization to the one or more UAVs for a descent. The flying lane management method 750 can further include, based on the feedback, detecting a new obstruction; and one of updating the flying lane based on adjustments made by the one or more UAVs due to the new obstruction and providing an updated flying lane due to the new obstruction. The adjustments and/or the updated flying lane can include a buffer distance from the new obstruction. The new obstruction can be detected by the one or more UAVs based on hardware thereon and communicated to the air traffic control system. The air traffic control system can be adapted to operate autonomously.

In another exemplary embodiment, an air traffic control system communicatively coupled to one or more Unmanned Aerial Vehicles (UAVs) via one or more wireless networks adapted to perform flying lane management includes a network interface and one or more processors communicatively coupled to one another; and memory storing instructions that, when executed, cause the one or more processors to: initiate communication to the one or more UAVs at a preflight stage for each, wherein the communication is via one or more cell towers associated with the one or more wireless networks, wherein the plurality of UAVs each include hardware and antennas adapted to communicate to the plurality of cell towers; determine a flying lane for the one or more UAVs based on a destination, current air traffic in a region under management of the air traffic control system, and based on detected obstructions in the region; and provide the flying lane to the one or more UAVs are an approval to take off and fly along the flying lane. The instructions, when executed, can further cause the one or more processors to: continue the communication during flight on the flying lane and receiving data from the one or more UAVs, wherein the data include feedback during the flight; and utilize the feedback to update the flying lane, to update other flying lanes, and to manage air traffic in the region.

During the flight, the feedback includes speed, altitude, and heading, and the feedback can further include one or more of temperature, humidity, wind, and detected obstructions. The instructions, when executed, can further cause the one or more processors to: provide updates to the flying lane based on the feedback and based on feedback from other devices. The instructions, when executed, can further cause the one or more processors to: based on the feedback, determine the one or more UAVs at ready to descend or fly to the destination and providing authorization to the one or more UAVs for a descent. The instructions, when executed, can further cause the one or more processors to: based on the feedback, detect a new obstruction; and one of update the flying lane based on adjustments made by the one or more UAVs due to the new obstruction and provide an updated flying lane due to the new obstruction. The adjustments and/or the updated flying lane can include a buffer distance from the new obstruction. The new obstruction can be detected by the one or more UAVs based on hardware thereon and communicated to the air traffic control system. The air traffic control system can be adapted to operate autonomously.

§ 11.0 Air Traffic Control Monitoring Systems and Methods

Figure 14:
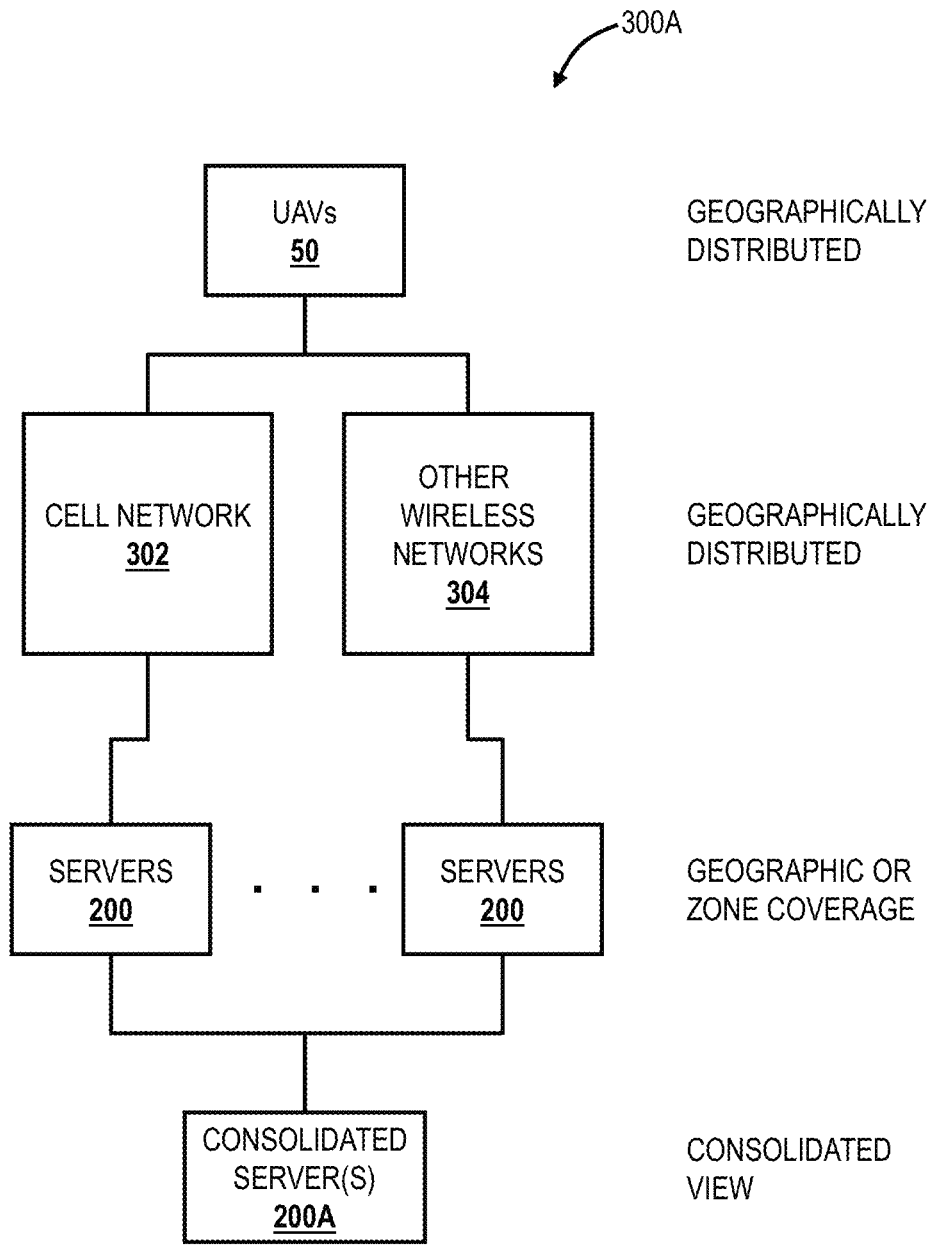
FIG. 14 is a block diagram of functional components of a consolidated UAV air traffic control monitoring system.

Referring to FIG. 14, in an exemplary embodiment, a block diagram illustrates functional components of a consolidated UAV air traffic control monitoring system 300A. The monitoring system 300A is similar to the UAV air traffic control system 300 described herein. Specifically, the monitoring system 300A includes the cell network 302 (or multiple cell networks 302) as well as the other wireless networks 304. The one or more servers 200 are communicatively coupled to the networks 302, 304 in a similar manner as in the UAV air traffic control system 300 as well as the UAVs 50 communication with the servers 200. Additionally, the monitoring system 300A includes one or more consolidated servers 200A which are communicatively coupled to the servers 200.

The consolidated servers 200A are configured to obtain a consolidated view of all of the UAVs 50. Specifically, the UAVs 50 are geographically distributed as are the networks 302, 304. The servers 200 provide geographic or zone coverage. For example, the servers 200 may be segmented along geographic boundaries, such as different cities, states, etc. The consolidated servers 200A are configured to provide a view of all of the servers 200 and their associated geographic or zone coverage. Specifically, the consolidated servers 200A can be located in a national Air Traffic Control center. From the consolidated servers 200A, any air traffic control functions can be accomplished for the UAVs 50. The consolidated servers 200A can aggregate data on all of the UAVs 50 based on multiple sources, i.e., the servers 200, and from multiple networks 302, 304.

Thus, from the consolidated servers 200A, UAV traffic can be managed from a single point. The consolidated servers 200A can perform any of the air traffic control functions that the servers 200 can perform. For example, the consolidated servers 200A can be used to eliminate accidents, minimize delay and congestion, etc. The consolidate servers 200A can handle connectivity with hundreds or thousands of the servers 200 to manage millions or multiple millions of UAVs 50. Additionally, the consolidated servers 200A can provide an efficient Graphical User Interface (GUI) for air traffic control.

Figure 15:
FIG. 15 is a screen shot of a Graphical User Interface (GUI) providing a view of the consolidated UAV air traffic control monitoring system.

Referring to FIG. 15, in an exemplary embodiment, a screen shot illustrates a Graphical User Interface (GUI) providing a view of the consolidated UAV air traffic control monitoring system. Specifically, the GUI can be provided by the consolidated servers 200A to provide visualization, monitoring, and control of the UAVs 50 across a wide geography, e.g., state, region, or national. In FIG. 15, the GUI provides a map visualization at the national level, consolidating views from multiple servers 200. Various circles are illustrated with shading, gradients, etc. to convey information such as congestion in a local region.

A user can drill-down such as by clicking any of the circles or selecting any geographic region to zoom in. The present disclosure contemplates zooming between the national level down to local or even street levels to view individual UAVs 50. The key aspect of the GUI is the information display is catered to the level of UAV 50 traffic. For example, at the national level, it is not possible to display every UAV 50 since there are orders of magnitude more UAVs 50 than airplanes. Thus, at higher geographic levels, the GUI can provide a heat map or the like to convey levels of UAV 50 congestion. As the user drills-down to local geographies, individual UAVs 50 can be displayed.

Using the GUI, the consolidated servers 200A, and the servers 200, various air traffic control functions can be performed. One aspect is that control can be high-level (coarse) through individual-level (fine) as well as in-between. That is, control can be at a large geographic level (e.g., city or state), at a local level (city or smaller), and at an individual UAV 50 level. The high-level control can be performed via single commands through the consolidated server 200A that are propagated down to the servers 200 and to the UAVs 50. Examples of high-level control include no-fly zones, congestion control, traffic management, hold patterns, and the like. Examples of individual-level control include flight plan management; separation assurance; real-time control; monitoring of speed, altitude, location, and direction; weather and obstacle reporting; landing services; and the like.

In addition to the communication from the consolidated servers 200A to the UAVs 50, such as through the servers 200, for air traffic control functions, there can be two-way communication as well. In an exemplary embodiment, the UAVs 50 are configured to provide a first set of data to the servers 200, such as speed, altitude, location, direction, weather and obstacle reporting. The servers 200 are configured to provide a second set of data to the consolidated servers 200A, such as a summary or digest of the first data. This hierarchical data handling enables the consolidated servers 200A to handle nationwide control of millions of UAVs 50.

For example, when there is a view at the national level, the consolidated servers 200A can provide summary information for regions, such as illustrated in FIG. 15. This is based on the second set of data which can provide a summary view of the GUI, such as how many UAVs 50 are in a region. When there is a drill-down to a local level, the consolidated servers 200A can obtain more information from the servers, i.e., the first set of data, allowing the consolidated servers 200A to act in a similar manner as the servers 200 for local control.

Figure 16:
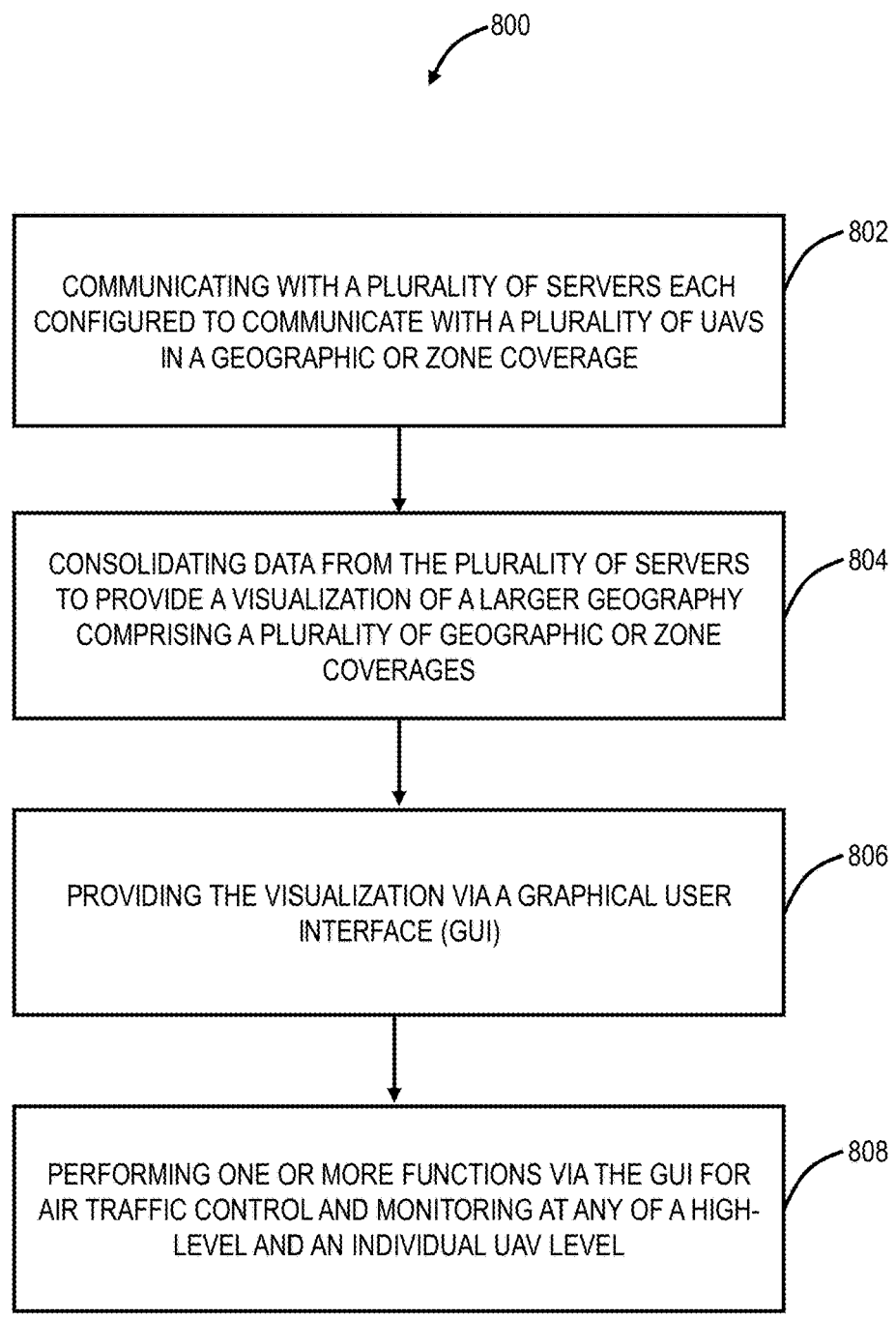
FIG. 16 is a flowchart of a UAV air traffic control and monitor method.

Referring to FIG. 16, in an exemplary embodiment, a flowchart illustrates a UAV air traffic control and monitor method 800. The method 800 includes communicating with a plurality of servers each configured to communicate with a plurality of UAVs in a geographic or zone coverage (step 802); consolidating data from the plurality of servers to provide a visualization of a larger geography comprising a plurality of geographic or zone coverages (step 804); providing the visualization via a Graphical User Interface (GUI) (step 806); and performing one or more functions via the GUI for air traffic control and monitoring at any of a high-level and an individual UAV level (step 808). The visualization can include a heat map of congestion at the larger geography and a view of individual UAVs via a drill-down. For the individual UAV level, the consolidating the data can include obtaining a first set of data and, for the high-level, the consolidating the data can include obtaining a second set of data which is a summary or digest of the first set of data. The first set of data can include speed, altitude, location, direction, weather and obstacle reporting from individual UAVs.

For the individual UAV level, the air traffic control and monitoring can include any of flight plan management; separation assurance; real-time control; monitoring of speed, altitude, location, and direction; weather and obstacle reporting; landing services, and wherein, for the high-level, the air traffic control and monitoring can include any of no-fly zones, congestion control, traffic management, and hold patterns. The plurality of UAVs can be configured to constrain flight based on coverage of a plurality of cell towers, wherein the constrained flight can include one or more of pre-configuring the plurality of UAVs to operate only where the coverage exists, monitoring cell signal strength by the plurality of UAVs and adjusting flight based therein, and a combination thereof. One or more of the plurality of UAVs are configured for autonomous operation through the air traffic control. The plurality of UAVs each can include circuitry adapted to communicate via a plurality of cell networks to the plurality of servers. The plurality of cell networks can include a first wireless network and a second wireless network each provide bidirectional communication between the UAV and the plurality of servers for redundancy with one of the first wireless network and the second wireless network operating as primary and another as a backup.

In another exemplary embodiment, an Unmanned Aerial Vehicle (UAV) air traffic control and monitoring system includes a network interface and one or more processors communicatively coupled to one another; and memory storing instructions that, when executed, cause the one or more processors to: communicate with a plurality of servers each configured to communicate with a plurality of UAVs in a geographic or zone coverage; consolidate data from the plurality of servers to provide a visualization of a larger geography comprising a plurality of geographic or zone coverages; provide the visualization via a Graphical User Interface (GUI); and perform one or more functions via the GUI for air traffic control and monitoring at any of a high-level and an individual UAV level.

In a further exemplary embodiment, a non-transitory computer-readable medium includes instructions that, when executed, cause one or more processors to perform steps of: communicating with a plurality of servers each configured to communicate with a plurality of UAVs in a geographic or zone coverage; consolidating data from the plurality of servers to provide a visualization of a larger geography comprising a plurality of geographic or zone coverages; providing the visualization via a Graphical User Interface (GUI); and performing one or more functions via the GUI for air traffic control and monitoring at any of a high-level and an individual UAV level.

Figure 17:
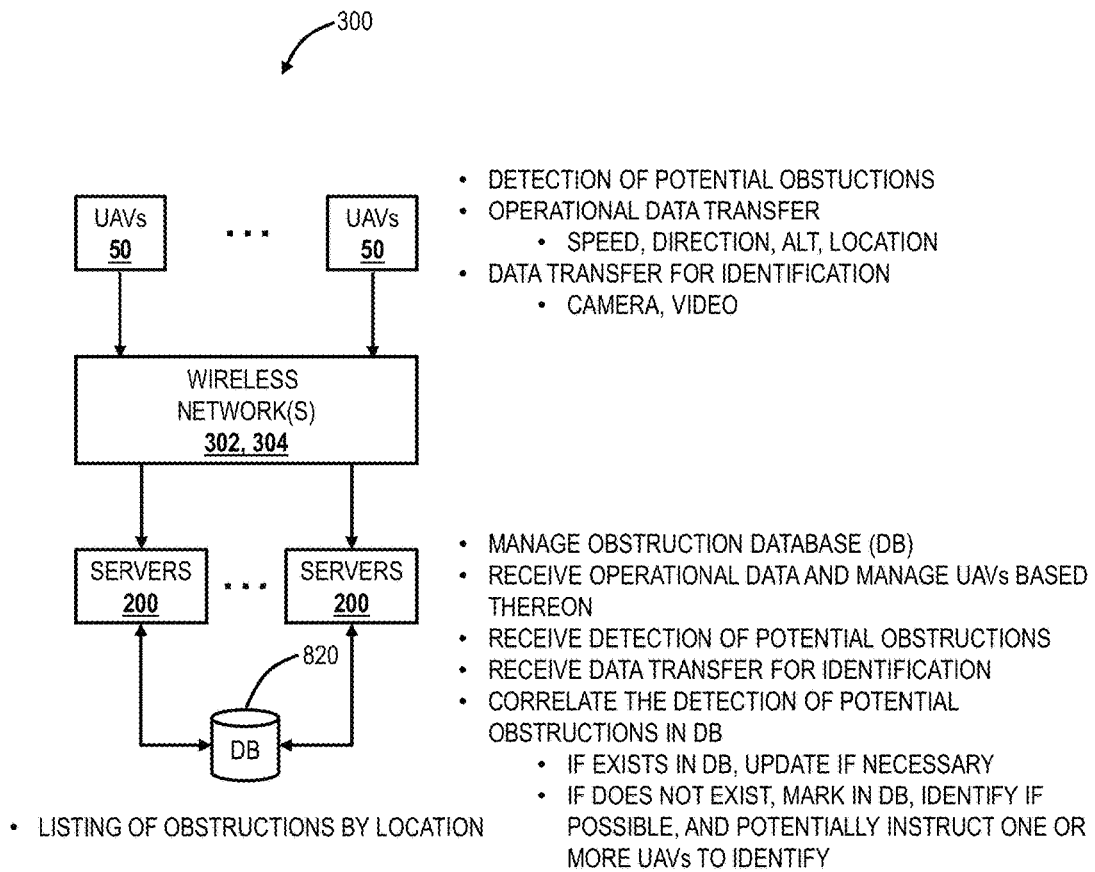
FIGS. 17 and 18 are block diagrams of the UAV air traffic control system describing functionality associated with obstruction detection, identification, and management with FIG. 17 describing data transfer from the UAVs to the servers and FIG. 18 describing data transfer to the UAVs from the servers.
Figure 18:
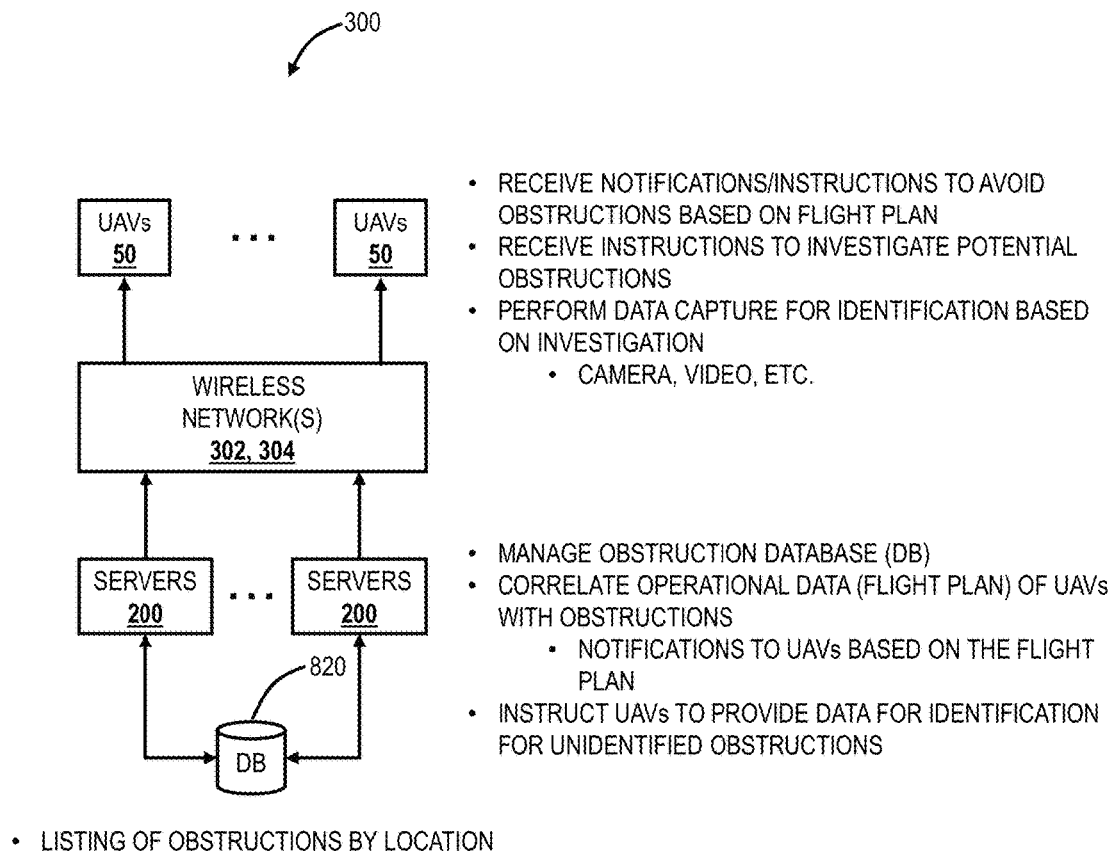

§ 12.0 Obstruction Detection, Identification, and Management Systems and Methods Referring to FIGS. 17 and 18, in an exemplary embodiment, block diagrams illustrate the UAV air traffic control system 300 describing functionality associated with obstruction detection, identification, and management with FIG. 17 describing data transfer from the UAVs 50 to the servers 200 and FIG. 18 describing data transfer to the UAVs 50 from the servers 200. As described herein, obstructions include, without limitation, other UAVs 50 based on their flight plan and objects at or near the ground at height above ground of several hundred feet. Again, the UAVs 50 typically fly at low altitudes such as 100'-500' and obstruction management is important based on this low level of flight.

The obstructions can be stored and managed in an obstruction database (DB) 820 communicatively coupled to the servers 200 and part of the UAV air traffic control system 300. Obstructions can be temporary or permanent and managed accordingly. Thus, the DB 820 can include an entry for each obstruction with location (e.g., GPS coordinates), size (height), and permanence. Temporary obstructions can be ones that are transient in nature, such as a scaffold, construction equipment, other UAVs 50 in flight, etc. Permanent obstructions can be buildings, power lines, cell towers, geographic (mountains), etc. For the permanence, each entry in the DB 820 can either be marked as permanent or temporary with a Time to Remove (TTR). The TTR can be how long the entry remains in the DB 820. The permanence is determined by the servers 200 as described herein.

The obstruction detection, identification, and management is performed in the context of the UAV air traffic control system 300 described herein with communication between the UAVs 50 and the servers 200 via the wireless networks 302, 304. FIGS. 17 and 18 illustrate functionality in the UAV air traffic control system 300 with FIGS. 17 and 18 separate to show different data flow and processing.

In FIG. 17, the UAVs 50 communicates to the servers 200 through the wireless networks 302, 304. Again, as described herein, the UAVs 50 have advanced data capture capabilities, such as video, photos, location coordinates, altitude, speed, wind, temperature, etc. Additionally, some UAVs 50 can be equipped with radar to provide radar data surveying proximate landscape. Collectively, the data capture is performed by data capture equipment associated with the UAVs 50.

Through the data capture equipment, the UAVs 50 are adapted to detect potential obstructions and detect operational data (speed, direction, altitude, heading, location, etc.). Based on one or more connections to the wireless networks 302, 304, the UAVs 50 are adapted to transfer the operational data to the servers 200. Note, the UAV 50 can be configured to do some local processing and transmit summaries of the operational data to reduce the transmission load on the wireless networks 302, 304. For example, for speed, heading, etc., the UAVs 50 can transmit delta information such that the servers 200 can track the flight plan. Note, the transmission of the operational data is performed throughout the flight such that the servers 200 can manage and control the UAVs 50.

For obstructions, the UAVs 50 can capture identification data, photos, video, etc. In an exemplary embodiment, the UAVs 50 are provided advanced notification of obstructions (in FIG. 18) and capable of local data processing of the identification data to verify the obstructions. If the local data processing determines an obstruction is already known, i.e., provided in a notification from the servers 200, the UAV 50 does not require any further processing or data transfer of the identification data, i.e., this obstruction is already detected. On the other hand, if the UAV 50 detects a potential obstruction, i.e., one that it has not been notified of, based on the local data processing, the UAV 50 can perform data transfer of the identification data to the servers 200.

The servers 200 are configured to manage the obstruction DB 820, namely to update the entries therein. The servers 200 are configured to receive operational data from the UAVs 50 under control for management thereof. Specifically, the servers 200 are configured to manage the flight plans of the UAVs 200, and, in particular with respect to obstructions, for advanced notification of future obstructions in the flight plan.

The servers 200 are configured to receive the detection of potential obstructions. The UAVs 200 can either simply notify the servers 200 of a potential obstruction as well as provide the identification data for the servers 200 to perform identification and analysis. Upon receipt of any data from the UAVs 200 related to obstructions (a mere notification, actual photos, etc.), the servers 200 are configured to correlate this data with the DB 820. If the data correlates to an entry that exists in the DB 820, the servers 200 can update the entry if necessary, e.g., update any information related to the obstruction such as last seen date.

If the servers 200 detect the potential obstruction does not exist in the DB 820, the servers 200 are configured to add an entry in the DB 820, perform identification if possible from the identification data, and potentially instruct a UAV 50 to identify in the future. For example, if the servers 200 can identify the potential obstruction from the identification data, the servers 200 can create the DB 820 entry and populate it with the identified data. The servers 200 can analyze the identification data, as well as request human review, using pattern recognition to identify what the obstruction is, what its characteristics are (height, size, permanency, etc.).

If the servers 200 do not have enough identification data, the servers 200 can instruct the identifying UAV 50 or another UAV 50 in proximity in the future to obtain specific identification data for the purposes of identification.

In FIG. 18, the servers 200 continue to manage the DB 820, both for populating/managing entries as well as to provide notifications of obstructions in the flight plans of each of the UAVs 50. Specifically, the servers 200 are configured to keep track of the flight plans of all of the UAVs 50 under its control. As part of this tracking, the servers 200 are configured to correlate the operational data to derive the flight plan and to determine any obstructions from the DB 820 in the flight plan. The servers 200 are configured to provide notifications and/or instructions to the UAVs 50 based on upcoming obstructions.

Additionally, the servers 200 are configured to provide instructions to UAVs 50 to capture identification data for potential obstructions that are not yet identified. Specifically, the servers 200 can instruct the UAVs 50 on what exact data to obtain, e.g., pictures, video, etc., and from what angle, elevation, direction, location, etc. With the identification data, the servers 200 can perform various processes to pattern match the pictures with known objects for identification. In case an obstruction is not matched, it can be flagged for human review. Also, human review can be performed based on successful matches to grade the performance and to further improve pattern matching techniques. Identification of the obstruction is important for permanency determinations. For example, a new high-rise building is permanent whereas a construction crane is temporary.

For the TTR, temporary obstructions are automatically removed in the DB 820 based on this entry. In an exemplary embodiment, the TTR can be a flag with a specified time. In another exemplary embodiment, the TTR can be a flag which requires removal if the next UAV 50 passing near the obstruction fails to detect and report it.

Figure 19:
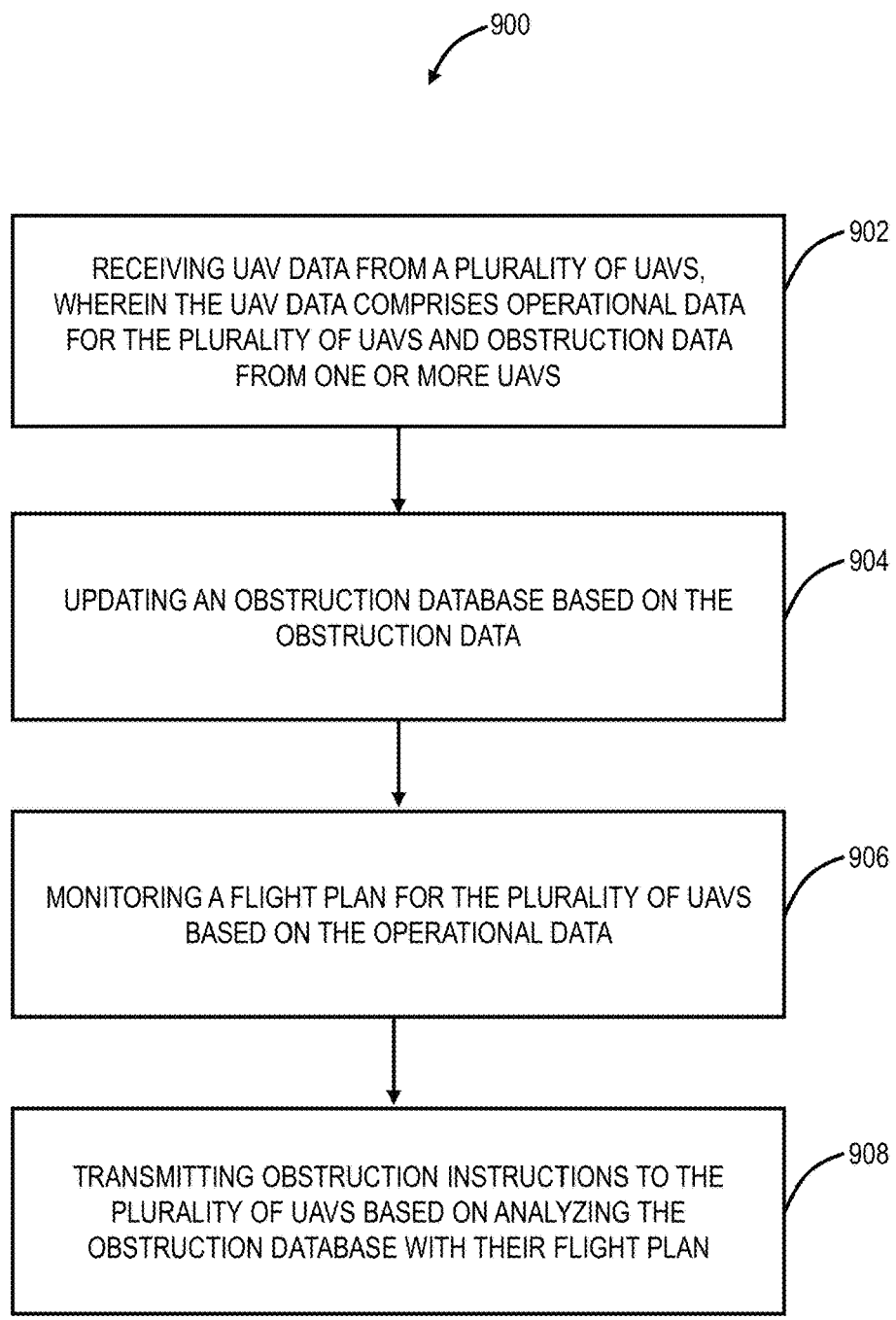
FIG. 19 is a flowchart of an obstruction detection and management method implemented through the UAV air traffic control system for the UAVs.

Referring to FIG. 19, in an exemplary embodiment, a flowchart illustrates an obstruction detection and management method 900 implemented through the UAV air traffic control system 300 for the UAVs 50. The obstruction detection and management method 900 includes receiving UAV data from a plurality of UAVs, wherein the UAV data comprises operational data for the plurality of UAVs and obstruction data from one or more UAVs (step 902); updating an obstruction database based on the obstruction data (step 904); monitoring a flight plan for the plurality of UAVs based on the operational data (step 906); and transmitting obstruction instructions to the plurality of UAVs based on analyzing the obstruction database with their flight plan (step 908).

The obstruction data can include an indication of a potential obstruction which was not provided to a UAV in the obstruction instructions. The obstruction data can include a confirmation of an obstruction based on the obstruction instructions, and wherein the updating can include noting any changes in the obstruction based on the confirmation. The obstruction instructions can include a request to a UAV to perform data capture of a potential obstruction, wherein the obstruction data can include photos and/or video of the potential obstruction, and wherein the updating can include identifying the potential obstruction based on the obstruction data.

The obstruction database can include entries of obstructions with their height, size, location, and a permanency flag comprising either a temporary obstruction or a permanent obstruction. The permanency flag can include a Time To Remove (TTR) for the temporary obstruction which is a flag with a specified time or a flag which requires removal if the next UAV passing near the temporary obstruction fails to detect and report it. The operational data can include a plurality of speed, location, heading, and altitude, and wherein the flight plan is determined from the operational data. The plurality of UAVs fly under about 1000'.

In another exemplary embodiment, an Unmanned Aerial Vehicle (UAV) air traffic control and monitoring system for obstruction detection and management includes a network interface and one or more processors communicatively coupled to one another; and memory storing instructions that, when executed, cause the one or more processors to receive UAV data from a plurality of UAVs, wherein the UAV data includes operational data for the plurality of UAVs and obstruction data from one or more UAVs; update an obstruction database based on the obstruction data; monitor a flight plan for the plurality of UAVs based on the operational data; and transmit obstruction instructions to the plurality of UAVs based on analyzing the obstruction database with their flight plan.

A non-transitory computer-readable medium comprising instructions that, when executed, cause one or more processors to perform steps of: receiving Unmanned Aerial Vehicle (UAV) data from a plurality of UAVs, wherein the UAV data includes operational data for the plurality of UAVs and obstruction data from one or more UAVs; updating an obstruction database based on the obstruction data; monitoring a flight plan for the plurality of UAVs based on the operational data; and transmitting obstruction instructions to the plurality of UAVs based on analyzing the obstruction database with their flight plan.

§ 13.0 Managing Detected Static Obstructions

Figure 20:
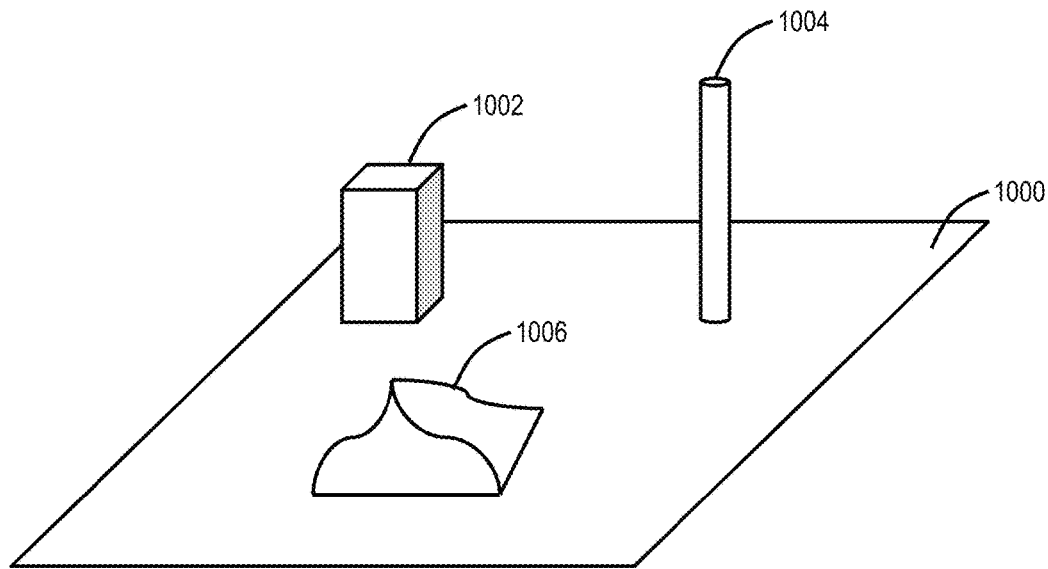
FIG. 20 is a diagram of geographical terrain with exemplary static obstructions.

Referring to FIG. 20, in an exemplary embodiment, a diagram illustrates geographical terrain 1000 with exemplary static obstructions 1002, 1004, 1006. As described herein, static obstructions are at or near the ground and can be temporary or permanent. Again, since the UAVs 50 fly much lower than conventional aircraft, these obstructions need to be managed and communicated to the UAVs 50. A dynamic obstruction can include moving objects such as other UAVs 50, vehicles on the ground, etc. Management of dynamic obstructions besides other UAVs 50 is difficult in the UAV air traffic control system 300 due to their transient nature. In an exemplary embodiment, the UAVs 50 themselves can include local techniques to avoid detected dynamic obstructions. The UAV air traffic control system 300 can be used to ensure all controlled UAVs 50 know about and avoid other proximate UAVs 50. Static obstructions, on the other hand, can be efficiently managed and avoided through the UAV air traffic control system 300. The UAV air traffic control system 300 can be used to detect the static obstructions through a combination of crowd-sourcing data collection by the UAVs 50, use of external databases (mapping programs, satellite imagery, etc.), and the like. The UAV air traffic control system 300 can also be used to communicate the detected static obstructions to proximate UAVs 50 for avoidance thereof.

Non-limiting examples of static obstructions which are permanent include buildings, mountains, cell towers, utility lines, bridges, etc. Non-limiting examples of static obstructions which are temporary include tents, parked utility vehicles, etc. From the UAV air traffic control system 300, these temporary and permanent static obstructions can be managed the same with the temporary obstructions having a Time To Remove (TTR) parameter which can remove it from the database 820.

The static obstructions can take various forms with different sizes, heights, etc. The static obstruction 1002 is substantially rectangular, e.g., a building or the like. The static obstruction 1004 can be substantially cylindrical, e.g., a cell tower, pole, or the like. The static obstruction 1006 can be irregularly shaped, e.g., a mountain, a building, or the like.

Figure 21:
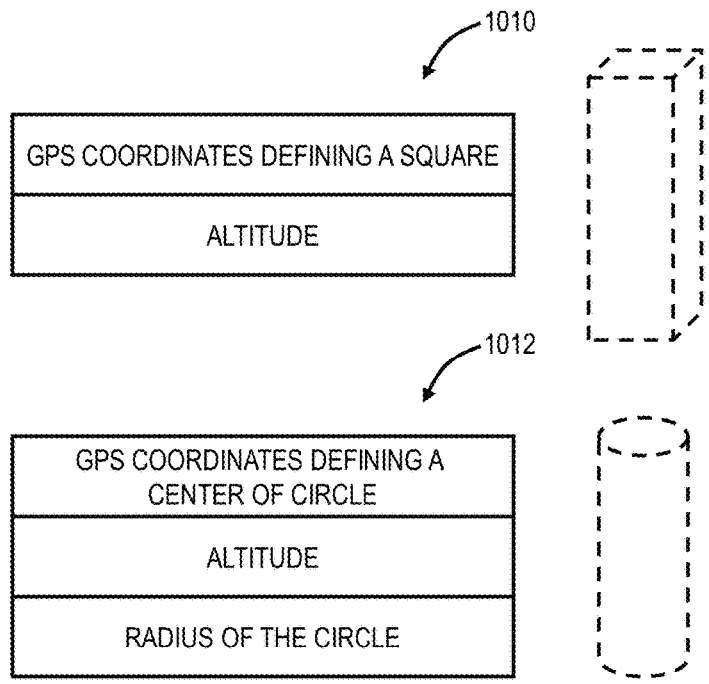
FIG. 21 is diagrams of data structures which can be used to define the exact location of any of the static obstructions.

Referring to FIG. 21, in an exemplary embodiment, diagrams illustrate data structures 1010, 1012 which can be used to define the exact location of any of the static obstructions 1002, 1004, 1006. The UAV air traffic control system 300 can use these data structures 1010, 1012 to store information in the database 820 regarding the associated static obstructions 1002, 1004, 1006. In an exemplary embodiment, the UAV air traffic control system 300 can use one or both of these data structures 1010, 1012 to define a location of the static obstructions 1002, 1004, 1006. This location can be a no-fly zone, i.e., avoided by the UAVs 50. The UAV air traffic control system 300 can use the data structure 1010 for the static obstruction 1002, 1006 and the data structure 1012 for the static obstruction 1004. In this manner, the UAVs 50 can know exactly where the static obstructions 1002, 1004, 1006 are located and fly accordingly.

The data structures 1010, 1012 can be managed by the UAV air traffic control system 300 based on data collection by the UAVs 50 and/or other sources. The data structures 1010, 1012 can be stored in the database 820 along with the TTR parameter for temporary or permanent.

To populate and manage the data structures 1010, 1012, i.e., to identify, characterize, and verify, the UAV air traffic control system 300 communicates with the UAVs 50 and/or with external sources. For the UAVs 50, the UAVs 50 can be configured to detect the static obstructions 1002, 4, 1006; collect relevant data such as locations, pictures, etc. for populating the data structures 1010, 1012; collect the relevant data at the direction of the UAV air traffic control system 300; provide verification the static obstructions 1002, 1004, 1006 subsequent to the UAV air traffic control system 300 notifying the UAVs 50 for avoidance/verification; and the like.

In an exemplary aspect, the UAVs 50, upon detecting an unidentified static obstruction 1002, 1004, 1006, the UAVs 50 can collect the relevant data and forward to the UAV air traffic control system 300. The UAV air traffic control system 300 can then analyze the relevant data to populate the data structures 1010, 1012. If additional data is required to fully populate the data structures 1010, 1012, the UAV air traffic control system 300 can instruct another UAV 50 at or near the detected static obstruction 1002, 1004, 1006 to collect additional data. For example, assume a first UAV 50 detects the static obstruction 1002, 1004, 1006 from the east, collects the relevant data, but this is not enough for the UAV air traffic control system 300 to fully populate the data structures 1010, 1012, the UAV air traffic control system 300 can instruct a second UAV 50 to approach and collect data from the west.

The UAVs 50 with communication between the UAV air traffic control system 300 can perform real-time detection of the static obstructions 1002, 1004, 1006. Additionally, the UAV air traffic control system 300 can utilize external sources for offline detection of the static obstructions 1002, 1004, 1006. For example, the external sources can include map data, public record data, satellite imagery, and the like. The UAV air traffic control system 300 can parse and analyze this external data offline to both populate the data structures 1010, 1012 as well as very the integrity of existing data in the data structures 1010, 1012.

Once the data structures 1010, 1012 are populated in the database 820, the UAV air traffic control system 300 can use this data to coordinate flights with the UAVs 50. The UAV air traffic control system 300 can provide relevant no fly zone data to UAVs 50 based on their location. The UAV air traffic control system 300 can also manage UAV landing zones based on this data, keeping emergency landing zones in different locations based on the static obstructions 1002, 1004, 1006; managing recharging locations in different locations based on the static obstructions 1002, 1004, 1006; and managing landing locations based on the static obstructions 1002, 1004, 1006.

Figure 22:
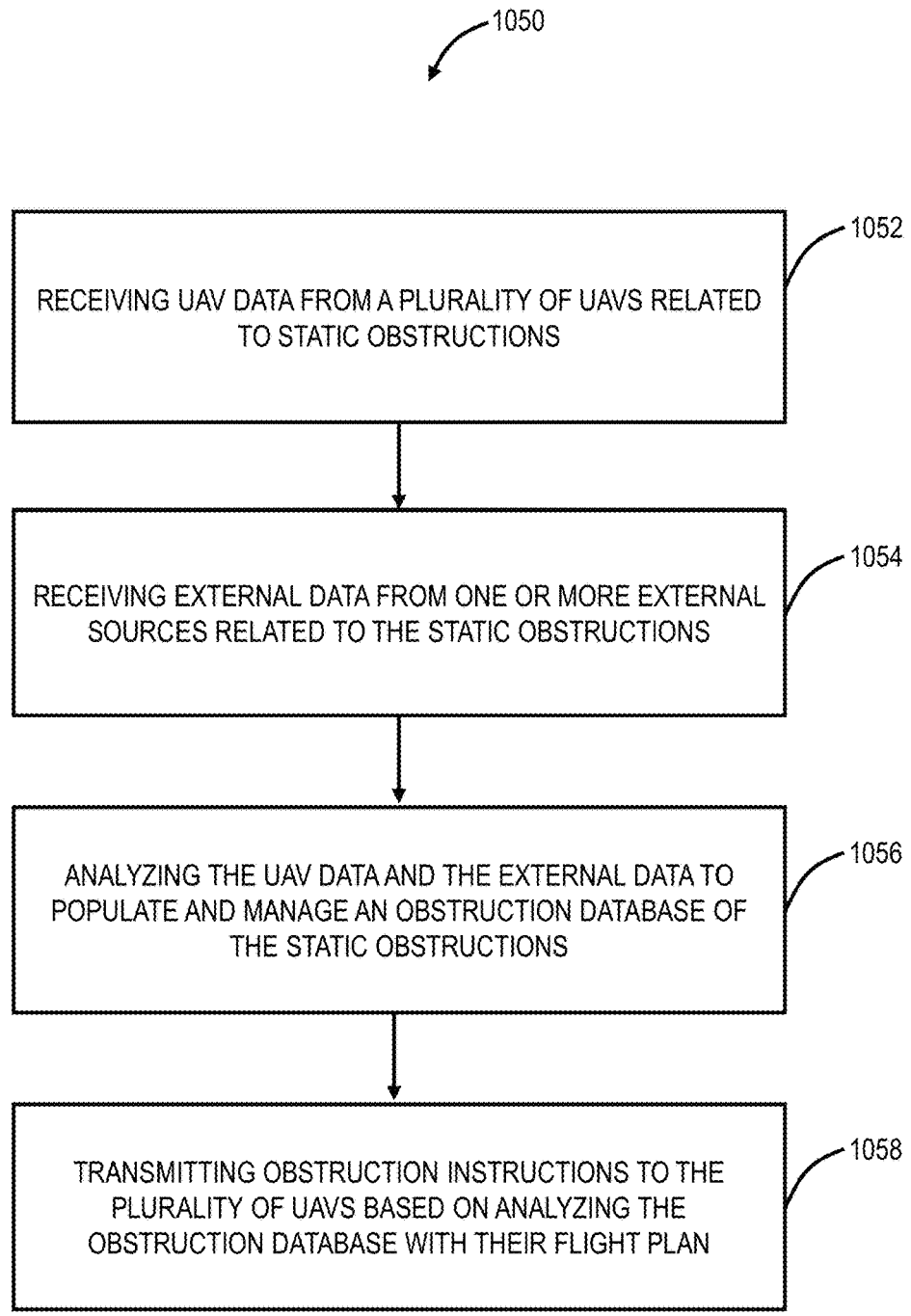
FIG. 22 is a flowchart of a static obstruction detection and management method through an Air Traffic Control (ATC) system for Unmanned Aerial Vehicles (UAVs)

Referring to FIG. 22, in an exemplary embodiment, a flowchart illustrates a static obstruction detection and management method 1050 through an Air Traffic Control (ATC) system for Unmanned Aerial Vehicles (UAVs). The static obstruction detection and management method 1050 includes receiving UAV data from a plurality of UAVs related to static obstructions (step 1052); receiving external data from one or more external sources related to the static obstructions (step 1054); analyzing the UAV data and the external data to populate and manage an obstruction database of the static obstructions (step 1056); and transmitting obstruction instructions to the plurality of UAVs based on analyzing the obstruction database with their flight plan (step 1058).

The obstruction database can include a plurality of data structures each defining a no fly zone of location coordinates based on the analyzing. The data structures define one of a cylinder and a rectangle sized to cover an associated obstruction and with associated location coordinates. The data structures each can include a time to remove parameter defining either a temporary or a permanent obstruction. One of the UAV data and the external data can be used to first detect an obstruction and enter the obstruction in the obstruction database and the other of the UAV data and the external data is used to verify the obstruction in the obstruction database. The static obstruction detection and management method 1050 can further include transmitting instructions to one or more UAVs to obtain additional information to populate and manage the obstruction database. The static obstruction detection and management method 1050 can further include managing one or more of emergency landing locations, recharging locations, and landing locations for the plurality of UAVs based on the obstruction database. The plurality of UAVs fly under about 1000' and the obstructions are based thereon.

§ 14.0 UAV Configuration

Figure 23:
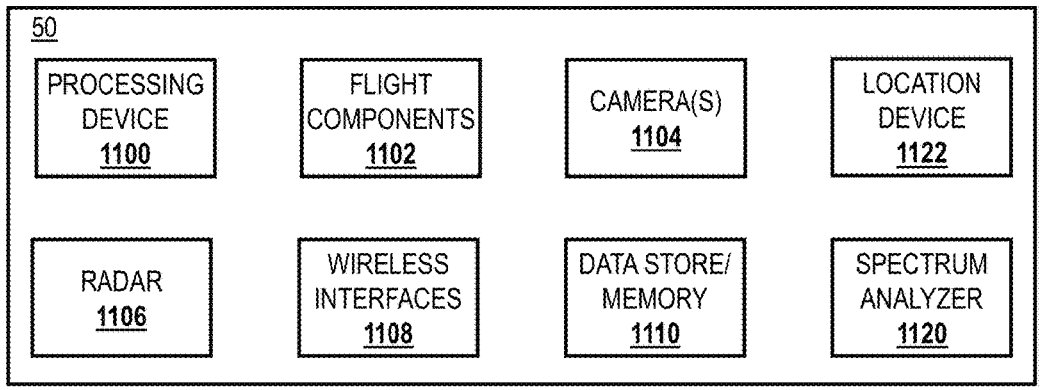
FIG. 23 is a block diagram of functional components implemented in physical components in the UAV for use with the air traffic control system, such as for dynamic and static obstruction detection.

Referring to FIG. 23, in an exemplary embodiment, a block diagram illustrates functional components implemented in physical components in the UAV 50 for use with the air traffic control system 300, such as for dynamic and static obstruction detection. This exemplary embodiment in FIG. 23 can be used with any of the UAV 50 embodiments described herein. The UAV 50 can include a processing device 1100, flight components 1102, cameras 1104, radar 1106, wireless interfaces 1108, a data store/memory 1110, a spectrum analyzer 1120, and a location device 1122. These components can be integrated with, disposed on, associated with the body 82 of the UAV 50. The processing device 1100 can be similar to the mobile device 100 or the processor 102. Generally, the processing device 1100 can be configured to control operations of the flight components 1102, the cameras 1104, the radar 1106, the wireless interfaces 1108, and the data store/memory 1110.

The flight components 1102 can include the rotors 80 and the like. Generally, the flight components 1102 are configured to control the flight, i.e., speed, direction, altitude, heading, etc., of the UAV 50 responsive to control by the processing device 1100.

The cameras 1104 can be disposed on or about the body 82. The UAV 50 can include one or more cameras 1104, for example, facing different directions as well as supporting pan, tilt, zoom, etc. Generally, the cameras 1104 are configured to obtain images and video, including high definition. In an exemplary embodiment, the UAV 50 includes at least two cameras 1104 such as a front-facing and a rear-facing camera. The cameras 1104 are configured to provide the images or video to the processing device 1100 and/or the data store/memory 1110. The front-facing camera can be configured to detect obstructions in front of the UAV 50 as it flies and the rear-facing camera can be configured to obtain additional images for further characterization of the detected obstructions.

The radar 1106 can be configured to detect objects around the UAV 50 in addition to the cameras 1104, using standard radar techniques. The wireless interfaces 1108 can be similar to the wireless interfaces 106 with similar functionality. The data store/memory 1110 can be similar to the data store 108 and the memory 110. The wireless interfaces 1108 can be used to communicate with the air traffic control system 300 over one or more wireless networks as described herein.

Collectively, the components in the UAV 50 are configured to fly the UAV 50 and concurrent detect and identify obstructions during the flight. In an exemplary embodiment, the radar 1106 can detect an obstruction through the processing device 1100, the processing device 1100 can cause the cameras 1104 to obtain images or video, the processing device 1100 can cause adjustments to the flight plan accordingly, and the processing device 1100 can identify aspects of the obstruction from the images or video. In another exemplary embodiment, the camera 1104 can detect the obstruction, the processing device 1100 can cause adjustments to the flight plan accordingly, and the processing device 1100 can identify aspects of the obstruction from the images or video. In a further exemplary embodiment, the front-facing camera or the radar 1106 can detect the obstruction, the processing device 1100 can cause the rear-facing and/or the front-facing camera to obtain images or video, the processing device 1100 can cause adjustments to the flight plan accordingly, and the processing device 1100 can identify aspects of the obstruction from the images or video.

In all the embodiments, the wireless interfaces 1108 can be used to communicate information about the detected obstruction to the air traffic control system 300. This information can be based on the local processing by the processing device 1100 and the information can include, without limitation, size, location, shape, type, images, movement characteristics, etc.

For dynamic obstructions, the UAV 50 can determine movement characteristics such as from multiple images or video. The movement characteristics can include speed, direction, altitude, etc. and can be derived from analyzing the images of video over time. Based on these characteristics, the UAV 50 can locally determine how to avoid the detected dynamic obstructions.

Additionally, the air traffic control system 300 can keep track of all of the UAVs 50 under its control or management. Moving UAVs 50 are one example of dynamic obstructions. The air traffic control system 300 can notify the UAVs 50 of other UAVs 50 and the UAVs 50 can also communicate the detection of the UAVs 50 as well as other dynamic and static obstructions to the air traffic control system 300.

The spectrum analyzer 1120 is configured to measure wireless performance. The spectrum analyzer 1120 can be incorporated in the UAV 50, attached thereto, etc. The spectrum analyzer 1120 is communicatively coupled to the processing device 1100 and the location device 1122. The location device 1122 can be a Global Positioning Satellite (GPS) device or the like. Specifically, the location device 1122 is configured to determine a precise location of the UAV 50. The spectrum analyzer 1120 can be configured to detect signal bandwidth, frequency, and Radio Frequency (RF) strength. These can collectively be referred to as measurements and they can be correlated to the location where taken from the location device 1122.

Figure 24:
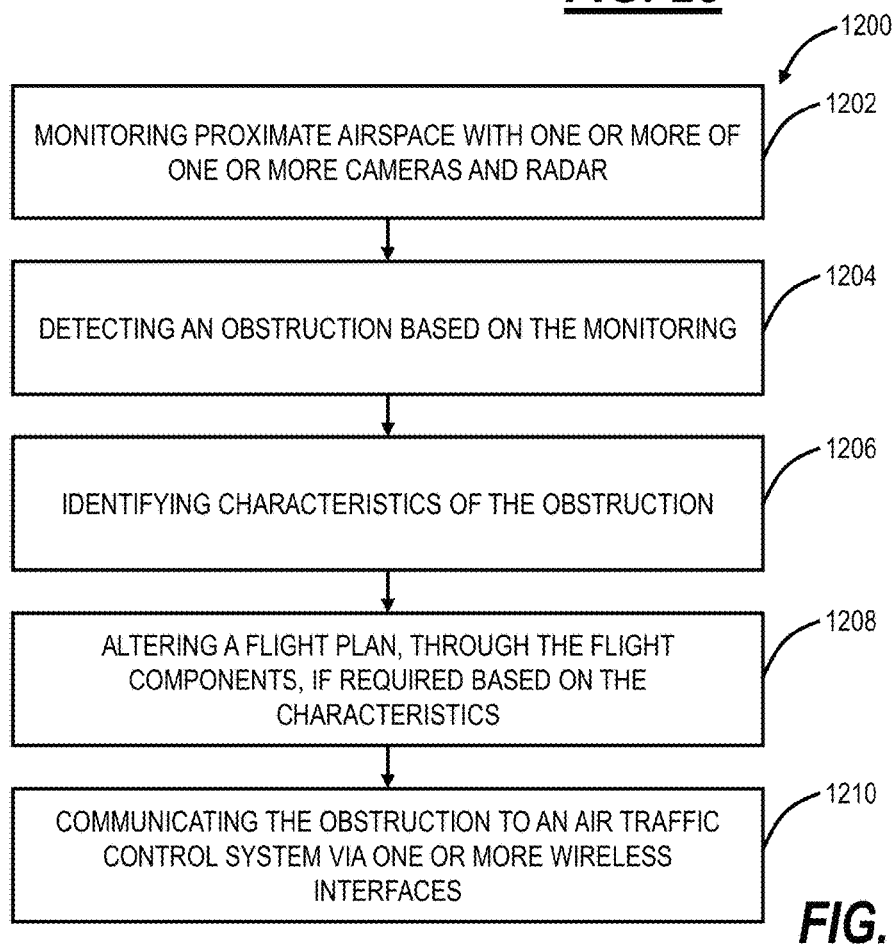
FIG. 24 is a flowchart of a UAV method for obstruction detection.

Referring to FIG. 24, in an exemplary embodiment, a flowchart illustrates a UAV method 1200 for obstruction detection. The UAV includes flight components attached or disposed to a base; one or more cameras; radar; one or more wireless interfaces; and a processing device communicatively coupled to the flight components, the one or more cameras, the radar, and the wireless interfaces. The UAV method 1200 includes monitoring proximate airspace with one or more of one or more cameras and radar (step 1202); detecting an obstruction based on the monitoring (step 1204); identifying characteristics of the obstruction (step 1206); altering a flight plan, through the flight components, if required based on the characteristics (step 1208); and communicating the obstruction to an air traffic control system via one or more wireless interfaces (step 1210).

The detecting can be via the radar and the method 1200 can further include causing the one or more cameras to obtain images or video of the detected obstruction at a location based on the radar; and analyzing the images or video to identify the characteristics. The detecting can be via the one or more cameras and the method 1200 can further include analyzing images or video from the one or more cameras to identify the characteristics. The one or more cameras can include a front-facing camera and a rear-facing camera and the method 1200 can further include causing one or more of the front-facing camera and the rear-facing camera to obtain additional images or video; and analyzing the images or video to identify the characteristics. The obstructions can include dynamic obstructions and the characteristics comprise size, shape, speed, direction, altitude, and heading. The characteristics can be determined based on analyzing multiple images or video over time. The UAV method 1200 can further include receiving notifications from the air traffic control system related to previously detected obstructions; and updating the air traffic control system based on the detect of the previously detected obstructions. The characteristics are for an obstruction database maintained by the air traffic control system.

§ 15.0 Waypoint Directory

In an exemplary embodiment, the UAV air traffic control system 300 uses a plurality of waypoints to manage air traffic in a geographic region. Again, waypoints are sets of coordinates that identify a point in physical space. The waypoints can include longitude and latitude as well as an altitude. For example, the waypoints can be defined over some area, for example, a square, rectangle, hexagon, or some other geometric shape, covering some amount of area. It is not practical to define a waypoint as a physical point as this would lead to an infinite number of waypoints for management by the UAV air traffic control system 300. Instead, the waypoints can cover a set area, such every foot to hundred feet or some other distance. In an exemplary embodiment, the waypoints can be set between 1' to 50' in dense urban regions, between 1' to 100' in metropolitan or suburban regions, and between 1' to 1000' in rural regions. Setting such sized waypoints provides a manageable approach in the UAV air traffic control system 300 and for communication over the wireless networks with the UAVs 50. The waypoints can also include an altitude. However, since UAV 50 flight is generally constrained to several hundred feet, the waypoints can either altitude or segment the altitude in a similar manner as the area. For example, the altitude can be separated in 100' increments, etc. Accordingly, the defined waypoints can blanket an entire geographic region for management by the UAV air traffic control system 300.

The waypoints can be detected by the UAVs 50 using location identification components such as GPS. A typical GPS receiver can locate a waypoint with an accuracy of three meters or better when used with land-based assisting technologies such as the Wide Area Augmentation System (WAAS). Waypoints are managed by the UAV air traffic control system 300 and communicated to the UAVs 50, and used for a variety purposes described herein. In an exemplary embodiment, the waypoints can be used to define a flight path for the UAVs 50 by defining a start and end waypoint as well as defining a plurality of intermediate waypoints.

The waypoints for a given geographic region (e.g., a city, region, state, etc.) can be managed in a waypoint directory which is stored and managed in the DB 820. The DB 820 can include the waypoint directory and actively manage a status of each waypoint. For example, the status can be either obstructed, clear, or unknown. With these classifications, the UAV air traffic control system 300 can actively manage UAV 50 flight paths. The UAVs 50 can also check and continually update the DB 820 through communication with the UAV air traffic control system 300. The use of the waypoints provides an efficient mechanism to define flight paths.

§ 15.1 Use of Waypoints

The UAV air traffic control system 300 and the UAVs 50 can use the waypoints for various purposes including i) flight path definition, ii) start and end point definition, iii) tracking of UAVs 50 in flight, iv) measuring the reliability and accuracy of information from particular UAVs 50, v) visualizations of UAV 50 flight, and the like. For flight path definition, the waypoints can be a collection of points defining how a particular UAV 50 should fly. In an exemplary embodiment, the flight path can be defined with waypoints across the entire flight path. In another exemplary embodiment, the flight path can be defined by various marker waypoints allowing the particular UAV 50 the opportunity to locally determine flight paths between the marker waypoints. In a further exemplary embodiment, the flight path is defined solely by the start and end waypoints and the UAV 50 locally determines the flight path based thereon.

In these embodiments, the intermediate waypoints are still monitored and used to manage the UAV 50 in flight. In an exemplary embodiment, the UAV 50 can provide updates to the UAV air traffic control system 300 based on obstruction detection as described herein. These updates can be used to update the status of the waypoint directory in the DB 820. The UAV air traffic control system 300 can use the waypoints as a mechanism to track the UAVs 50. This can include waypoint rules such as no UAV 50 can be in a certain proximity of another UAV 50 based on the waypoints, speed, and direction. This can include proactive notifications based on the current waypoint, speed, and direction, and the like.

In an exemplary embodiment, the waypoints can be used for measuring the reliability and accuracy of information from particular UAVs 50. Again, the waypoints provide a mechanism to define the geography. The UAV air traffic control system 300 is configured to receive updates from UAVs 50 about the waypoints. The UAV air traffic control system 300 can determine the reliability and accuracy of the updates based on crowd-sourcing the updates. Specifically, the UAV air traffic control system 300 can receive an update which either confirms the current status or changes the current status. For example, assume a waypoint is currently clear and an update is provided which says the waypoint is clear, then this UAV 50 providing the update is likely accurate. Conversely, assume a waypoint is currently clear and an update is provided which says the waypoint is now obstructed, but a short time later, another update from another UAV 50 says the waypoint is clear, this may reflect inaccurate information. Based on comparisons between UAVs 50 and their associated waypoint updates, scoring can occur for the UAVs 50 to determine reliability and accuracy. This is useful for the UAV air traffic control system 300 to implement status update changes—preference may be given to UAVs 50 with higher scoring.

The waypoints can also be used for visualization in the UAV air traffic control system 300. Specifically, waypoints on mapping programs provide a convenient mechanism to show location, start and end points, etc. The waypoints can be used to provide operators and pilots visual information related to one or more UAVs 50.

Figure 25:
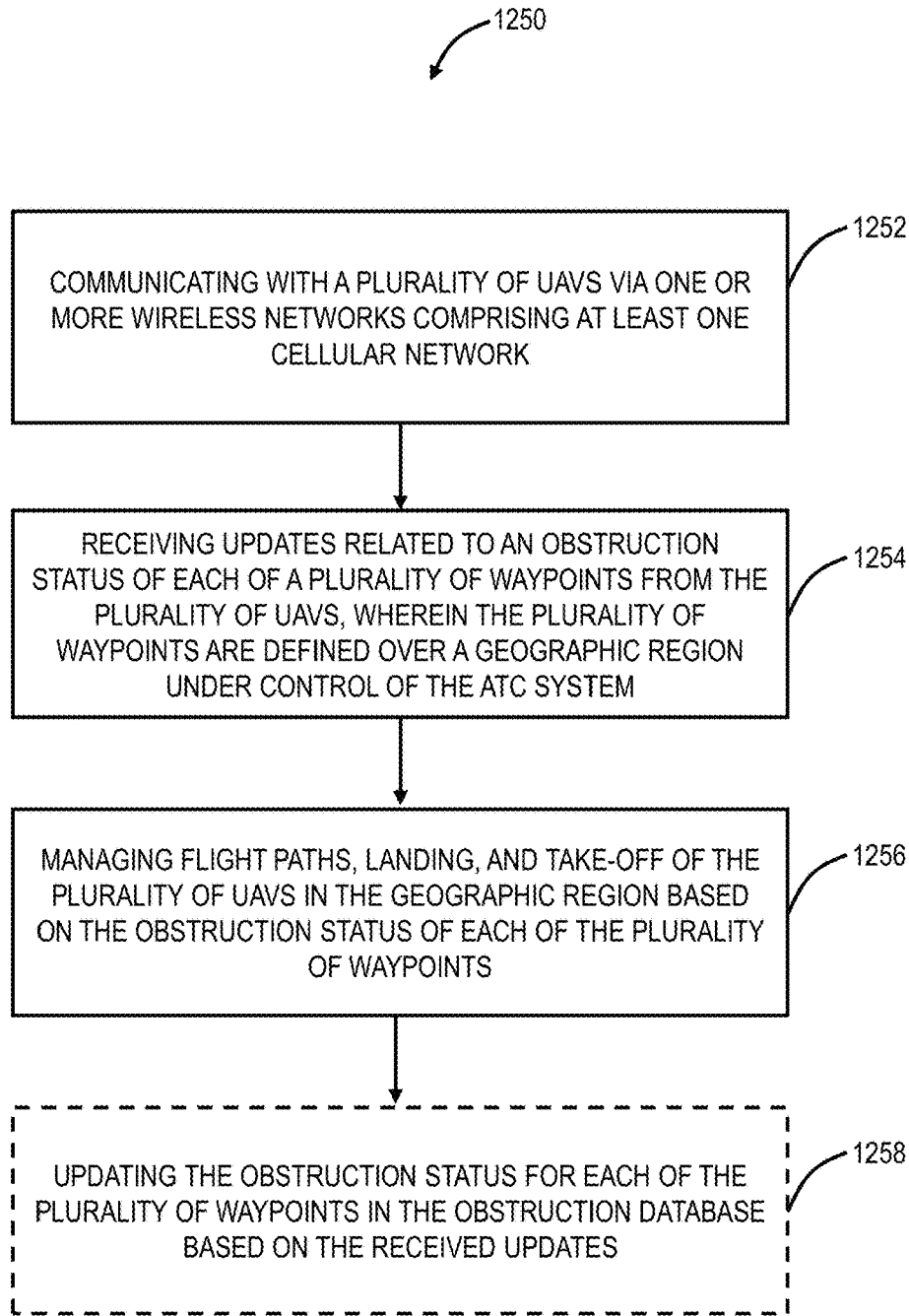
FIG. 25 is a flowchart of a waypoint management method for an Air Traffic Control (ATC) system for Unmanned Aerial Vehicles (UAVs)

Referring to FIG. 25, in an exemplary embodiment, a flowchart illustrates a waypoint management method 1250 for an Air Traffic Control (ATC) system for Unmanned Aerial Vehicles (UAVs). The waypoint management method 1250 includes communicating with a plurality of UAVs via one or more wireless networks comprising at least one cellular network (step 1252); receiving updates related to an obstruction status of each of a plurality of waypoints from the plurality of UAVs, wherein the plurality of waypoints are defined over a geographic region under control of the ATC system (step 1254); and managing flight paths, landing, and take-off of the plurality of UAVs in the geographic region based on the obstruction status of each of the plurality of waypoints (step 1256). The plurality of waypoints each include a latitude and longitude coordinate defining a point about which an area is defined for covering a portion of the geographic region. A size of the area can be based on whether the area covers an urban region, a suburban region, and a rural region in the geographic area, wherein the size is smaller for the urban region than for the suburban region and the rural region, and wherein the size is smaller for the suburban region than for the rural region. Each of the plurality of waypoints can include an altitude range set based on flight altitudes of the plurality of UAVs.

The ATC system can include an obstruction database comprising a data structure for each of the plurality of waypoints defining a unique identifier of a location and the obstruction status, and wherein the obstruction status comprises one of clear, obstructed, and unknown. The waypoint management method 1250 can further include updating the obstruction status for each of the plurality of waypoints in the obstruction database based on the received updates (step 1258). The waypoint management method 1250 can further include defining the flight paths based on specifying two or more waypoints of the plurality of waypoints. A flight path can be defined by one of: specifying a start waypoint and an end waypoint and allowing a UAV to locally determine a path therebetween; and specifying a start waypoint and an end waypoint and a plurality of intermediate waypoints between the start waypoint and the end waypoint. The waypoint management method 1250 can further include scoring each UAV's updates for the plurality of waypoints to determine reliability and accuracy of the updates.

In another exemplary embodiment, an Air Traffic Control (ATC) system for Unmanned Aerial Vehicles (UAVs) using waypoint management includes a network interface and one or more processors communicatively coupled to one another, wherein the network interface is communicatively coupled to a plurality of UAVs via one or more wireless networks; and memory storing instructions that, when executed, cause the one or more processors to communicate with a plurality of UAVs via one or more wireless networks comprising at least one cellular network; receive updates related to an obstruction status of each of a plurality of waypoints from the plurality of UAVs, wherein the plurality of waypoints are defined over a geographic region under control of the ATC system; and manage flight paths, landing, and take-off of the plurality of UAVs in the geographic region based on the obstruction status of each of the plurality of waypoints.

In a further exemplary embodiment, a non-transitory computer-readable medium comprising instructions that, when executed, cause one or more processors to perform steps of communicating with a plurality of UAVs via one or more wireless networks comprising at least one cellular network; receiving updates related to an obstruction status of each of a plurality of waypoints from the plurality of UAVs, wherein the plurality of waypoints are defined over a geographic region under control of the ATC system; and managing flight paths, landing, and take-off of the plurality of UAVs in the geographic region based on the obstruction status of each of the plurality of waypoints.

§ 16.0 Rogue or Distressed UAVs

As the number of UAVs 50 increase in a given geographical region, the UAV air traffic control system 300 advantageously provides unified management in the given geographical region. Plus, utilizing existing wireless networks 302, 304, coverage is in place. With the increased UAV 50 presence, there is significant risk due to rogue or distressed UAVs 50. That is, with increased air traffic, the risks of damage to people, property, vehicles, etc. significantly increases. As described herein, a rogue UAV 50 is one which is unauthorized, flying in a no-fly zone, under the control of a rogue operator including a terrorist or someone who bad intent, etc. A distressed UAV 50 is one which is malfunctioning, failed, unable to fly, suffering a power outage, etc. That is, with both rogue and distressed UAVs 50 in flight the objective is to cause the immediate shutdown and/or landing of these UAVs 50. Further, the objective is to support the immediate shutdown and/or landing in a manner that reduces risk of damage.

§ 16.1 Air Traffic Control Systems and Methods for Rogue or Distressed UAVs

Figure 26:
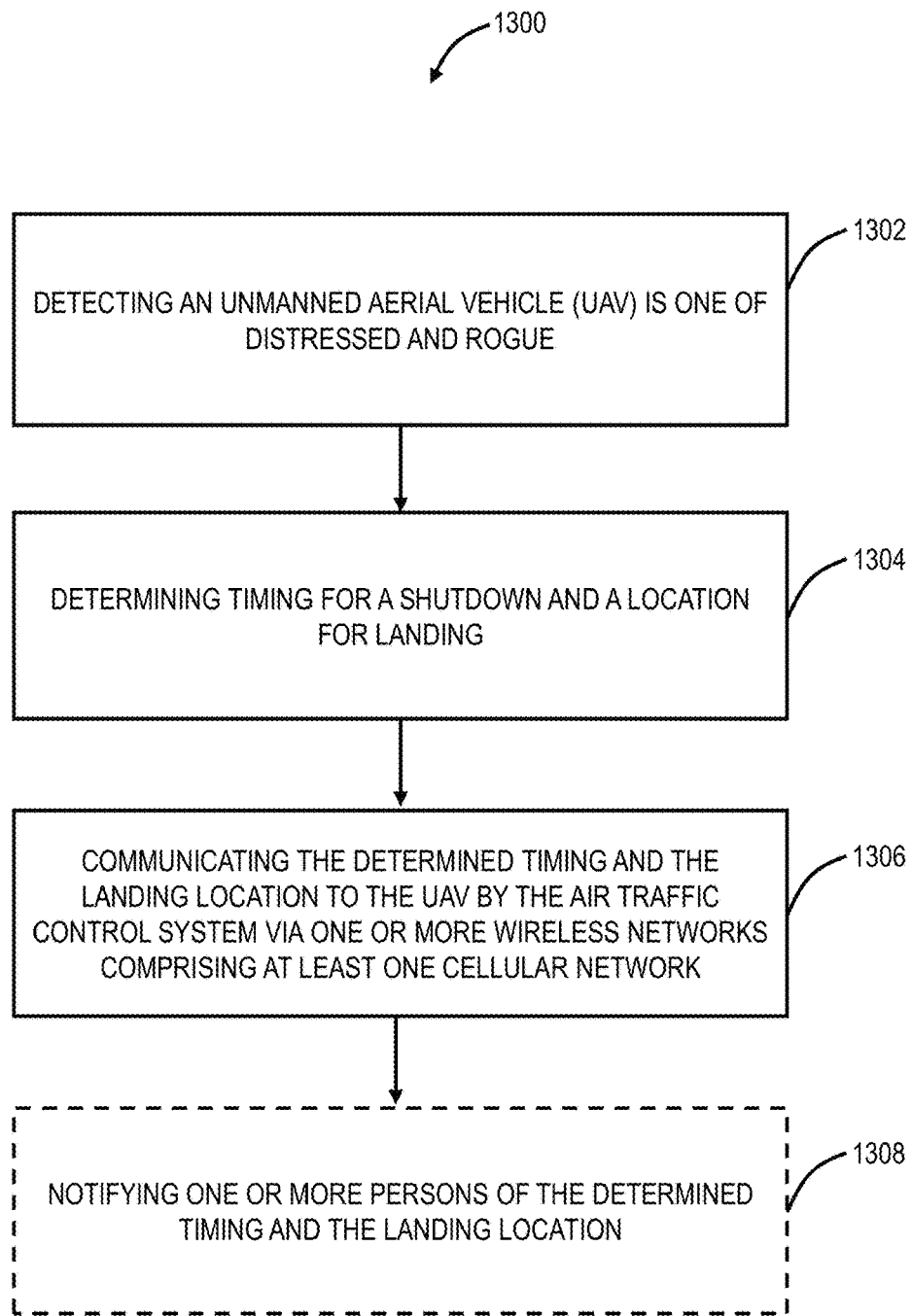
FIG. 26 is a flowchart of an air traffic control method for addressing rogue or distressed UAVs.

Referring to FIG. 26, in an exemplary embodiment, a flowchart illustrates an air traffic control method 1300 for addressing rogue or distressed UAVs. The air traffic control method 1300 includes detecting an Unmanned Aerial Vehicle (UAV) is one of distressed and rogue (step 1302), determining timing for a shutdown and a location for landing (step 1304), and communicating the determined timing and the landing location to the UAV by the Air Traffic Control system via one or more wireless networks comprising at least one cellular network (step 1306). The air traffic control method 1300 can further include notifying one or more persons of the determined timing and the landing location (step 1308).

The detection of the UAV 50 as one of distressed and rogue can be through various techniques. For a distressed UAV, the detection can be local at the UAV 50, e.g., a failure of some component, etc., and the detection can be based on the UAV 50 communicating to the air traffic control system 300. For example, the UAV 50 can be configured to periodically provide operational data to the air traffic control system 300 including detection of a local failure or distress condition. Also, for a distressed UAV, the detection can be by the air traffic control system 300, such as based on loss of communication, analysis of operational parameters exchanged between the UAV 50 and the air traffic control system 300, etc. For example, the air traffic control system 300 can glean distress from the operational parameters such as battery is low, rotors are inoperable, guidance is malfunctioning, etc. Further, for a distressed UAV, the detection can be external such as through another UAV 50 observing the distressed UAV, through surveillance cameras, based on manual input from observers (e.g., observers on the ground signal the air traffic control system 300), etc.

Even further, the detection of a distressed UAV can be based on a loss of communication between the UAV 50 and the air traffic control system 300. Again, the UAV 50 can periodically provide the operational parameters including a HELLO message to verify continued communication and the air traffic control system 300 can also provide corresponding ACK messages, i.e., a two-way handshake to verify communication exists. In the event a certain number of messages are not received or a period of time expires without the two-way handshake verifying communication, it can be assumed the UAV 50 is distressed and in need of landing. The objective here is to avoid having UAVs 50 in flight which are invisible or not under the control of the air traffic control system 300.

For a rogue UAV, the detection can be local such as based on the UAV 50 detecting it is flying in a no-fly zone or in an unauthorized area. More likely, the rogue UAV is detected externally such as through other UAVs 50, the air traffic control system 300, or observers proximate to the rogue UAV. Other UAVs 50 can detect proximate UAVs 50 and communicate this to the air traffic control system 300. From this detection, the air traffic control system 300 can detect rogue UAVs, i.e., unauthorized, unknown, flying erratically, malicious intent, etc. The rogue UAV can also be detected by observers which notify the air traffic control system 300.

The objective of determining timing for a shutdown and a location for landing is for either the UAV 50 or the air traffic control system 300 find a low risk location to land. The determined timing can be immediate or shortly thereafter with enough time for the UAV 50 to travel to a less risky location for the landing. In an exemplary embodiment, the UAV 50 is configured to determine the timing and the landing location. This can be in the case where there is no communication between the UAV 50 and the air traffic control system 300. Here, the UAV 50 can find a suitable landing location by itself such as based on its GPS and a map of predetermined safe landing locations, i.e., fields, non-residential areas, etc. The predetermined safe landing locations can be provided to the UAV 50 by the air traffic control system 300 when there is communication, prior to launch, or preprogrammed into the UAV 50. Alternatively, the UAV 50 can make a local decision based on its camera which monitors for safe locations.

In another exemplary embodiment, the determined timing and the landing location are determined by the air traffic control system 300. Here, the air traffic control system 300 can use its current knowledge of the geographical region to safely direct the UAV 50 to a safe location. The air traffic control system 300 can also maintain a map of predetermined safe landing locations. Of note, the air traffic control system 300 can make note of the distressed or rogue UAV and coordinate activity accordingly.

In an exemplary embodiment, the communicating the determined timing and the landing location can be by the air traffic control system 300 to the UAV 50. In another exemplary embodiment, the communicating can be from the UAV 50 locally, e.g., the processor 202 can communicate the determined timing and the location and cause the UAV 50 to proceed to land. The communicating the determined timing and the landing can be through guidance instructions, e.g., land at GPS location in the next 30s. Also, the communicating the determined timing and the landing can be through a "kill code" which automatically shuts off the UAV 50, such as when the UAV 50 is already at a safe location for landing.

The notifying can include providing alerts, alarms, visual notification, etc. using various known techniques. For example, the notification can be an alarm of varying levels—warning, minor, major, critical, immediate, etc. The notification can also be provided to nearby people, such as through SMS text alerts, etc. The method 1300 can also include communicating to other UAVs proximate to the UAV that is one of distressed and rogue and providing instructions for avoidance.

§ 16.2 UAV "Kill Code" and Commands

In various exemplary embodiments, the UAVs 50 can be configured for automatic communication to the networks 302, 304. The UAVs 50 can be configured with so-called "kill codes" which allow the air traffic control system 300 to remotely shut down the UAV 50. In another exemplary embodiment, another UAV 50 proximate to the UAV 50 can be configured to transmit the "kill code" point-to-point such as through a local wireless connection. Variously, it is expected that any UAV 50 that supports operation with the air traffic control system 300 is preprogrammed to implement the various techniques herein to support safe and immediate emergency landings.

§ 17.0 3D Wireless Coverage Mapping Using UAVs

Figure 27:
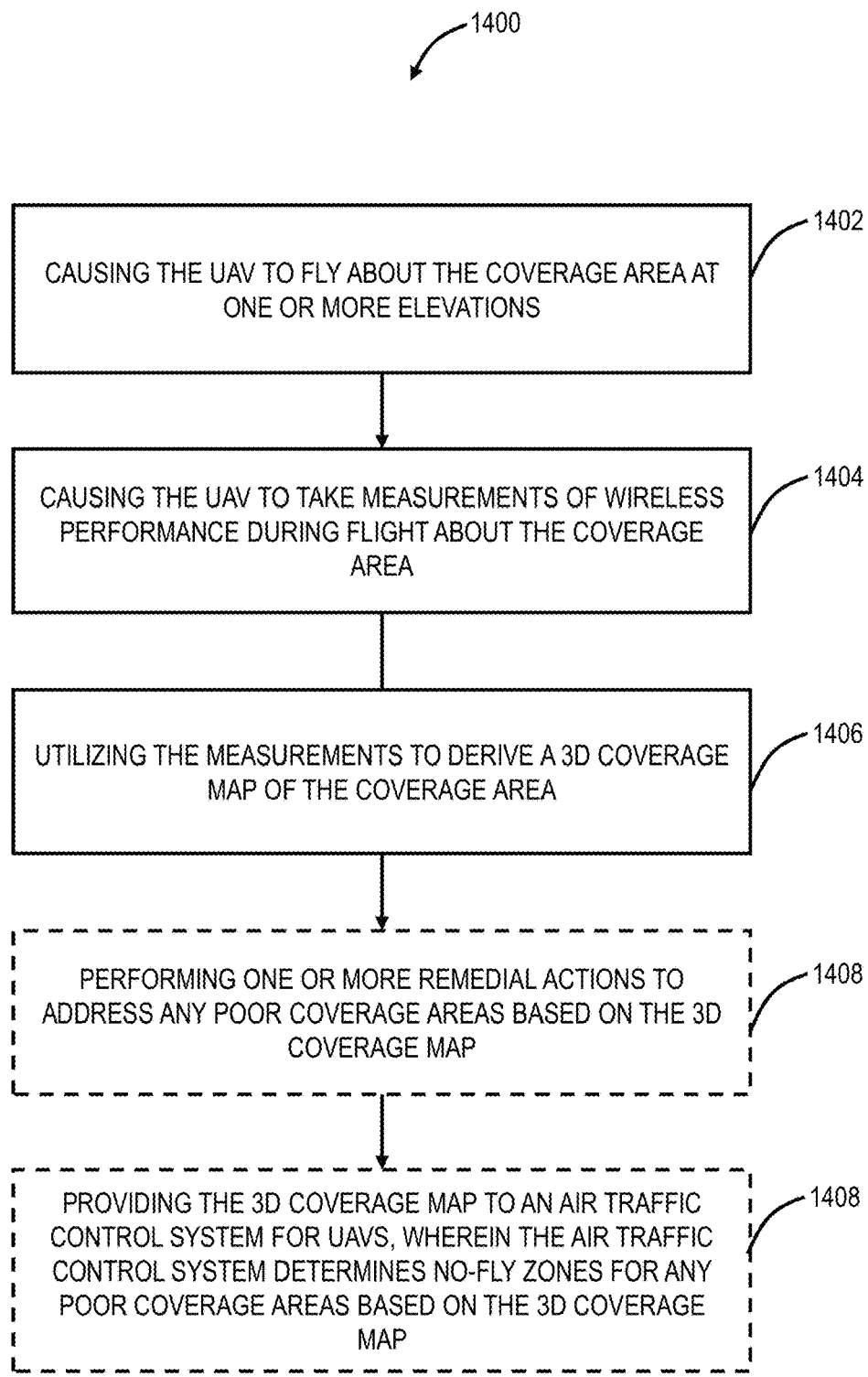
FIG. 27 is a flowchart of a 3D wireless coverage mapping method using the UAV.

Referring to FIG. 27, in an exemplary embodiment, a flowchart illustrates a 3D wireless coverage mapping method 1400 using the UAV 50. The 3D wireless coverage mapping method 1400 is performed using the UAV 50 specifically with the processing device 1100, the wireless interfaces 1108, the spectrum analyzer 1120, and the location device 1122. In some embodiments, the UAV 50 does not include the spectrum analyzer 1120, but instead only uses the wireless interfaces 1108 with the wireless interfaces 1108 configured for both communication on the wireless networks 302, 304 and for measuring coverage of the wireless networks 302, 304. In other embodiments, the spectrum analyzer 1120 is configured to take measurements of the wireless networks 302, 304.

The objective of the 3D wireless coverage mapping method 1400 is to obtain wireless measurements of the wireless networks 302, 304 at one or more different elevations using the UAV 50 and to create a 3D coverage map, i.e., a cloud map, of the wireless coverage of the wireless networks 302, 304. The UAV 50 is flown about the associated coverage areas 410, 412, 414 of the wireless networks 302, 304.

Once the 3D coverage map is created, an operator of the wireless networks 302, 304 can perform remedial actions to address coverage gaps. This can include adding additional antennas to a cell tower 12 associated with the cell site 10, adjusting patterns of existing antennas, adding new cell sites 10, and the like. Also, the UAV air traffic control system 300 can use the 3D coverage map to ensure UAVs 50 do not lose communication to the UAV air traffic control system 300. This can include so-called no-fly zones in areas of poor coverage based on the 3D coverage map, instructions to the UAVs 50 to avoid the areas of poor coverage, etc.

The UAV 50, to develop the 3D coverage map, can fly in various approaches at the associated coverage areas 410, 412, 414. In an exemplary embodiment, the UAV 50 flies in a circular pattern (e.g., either clockwise or counterclockwise) about the cell tower 12 at a set elevation (or at different elevations). In another exemplary embodiment, the UAV 50 flies in a zigzag pattern between adjacent cell towers 12 at a set elevation (or at different elevations). In various exemplary embodiments, the UAV 50 can fly at different elevations to cover the area above-the-ground where the UAVs 50 will fly and need coverage with the UAV air traffic control system 300. This can include tower height, between several hundred to several thousand feet, etc.

Also, the UAV 50 can adapt its flight plan about the associated coverage areas 410, 412, 414 based on feedback from the spectrum analyzer 1120 and/or the wireless interfaces 1108. For example, if the UAV 50 detects poor coverage, the UAV 50 can focus on this area to determine its readings are correct. Alternatively, if the UAV 50 detects good coverage, the UAV 50 can avoid detailed flights.

The method 1400 provides three-dimensional (3D) coverage mapping of a coverage area of a cell site using an Unmanned Aerial Vehicle (UAV). The method 1400 includes causing the UAV to fly about the coverage area at one or more elevations (step 1402); causing the UAV to take measurements of wireless performance during flight about the coverage area (step 1404); and utilizing the measurements to derive a 3D coverage map of the coverage area (step 1406). The method 1400 can further include performing one or more remedial actions to address any poor coverage areas based on the 3D coverage map (step 1408). The one or more remedial actions can include adding additional antennas to the cell site, adjusting antenna patterns of existing antennas, and adding new cell towers in the coverage area.

The method 1400 can further include providing the 3D coverage map to an Air Traffic Control system for UAVs, wherein the Air Traffic Control system determines no-fly zones for any poor coverage areas based on the 3D coverage map (step 1410). The UAV can include a spectrum analyzer which measures the wireless performance and a location device which correlates a location for each measurement. The one or more elevations can be 100' or more. The UAV can fly a circular pattern about a cell tower associated with the cell site. The UAV can adjust flight based on the measurements of wireless performance. The UAV can fly a zigzag pattern from a cell tower associated with the cell site to an adjacent cell site.

§ 17.0 Anti-drone Flight Protection

As described herein, the UAV air traffic control system 300 can be used to control various aspects of flight of the UAVs 50. With the proliferation of the UAVs 50 in various applications such as drone delivery, surveillance, hobby, and the like, there is a critical need to enforce so-called no-fly zones and geo-fences. As described herein, a no-fly zone is an area where UAVs 50 are prohibited to fly such as for regulations (airports, national security, etc.) or for private property reasons (telecommunication sites, etc.). A geo-fence is a virtualized fence which prevents UAVs 50 from accessing a location. Both the no-fly zone and the geo-fence are interrelated concepts and each can be defined by coordinates such as latitude, longitude, and altitude. That is, a no-fly zone or geo-fence can be any three-dimensional space defined by associated coordinates.

Figure 28:
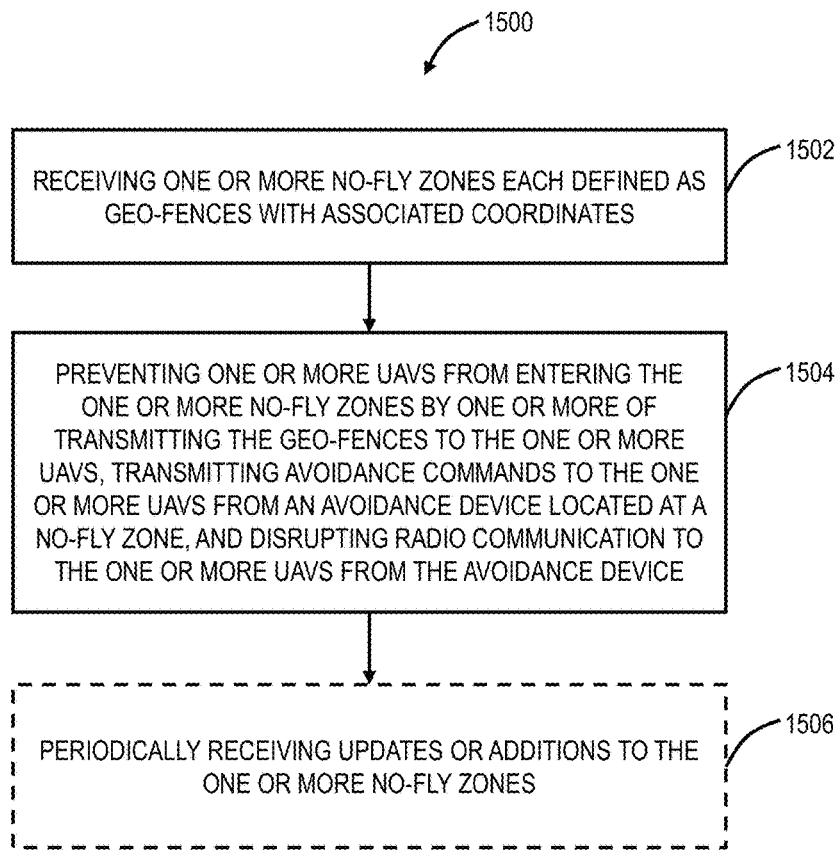
FIG. 28 is a flowchart of an anti-UAV flight protection method.

Referring to FIG. 28, in an exemplary embodiment, a flowchart illustrates an anti-UAV flight protection method 1500. In various exemplary embodiment, the present disclosure includes defining no-fly zones as geo-fences, providing the defined geo-fences to associated UAVs 50, and preventing flight in the defined no-fly zones or geo-fences of the UAVs 50. The method 1500 includes receiving one or more no-fly zones each defined as geo-fences with associated coordinates (step 1502); preventing one or more UAVs from entering the one or more no-fly zones by one or more of: transmitting the geo-fences to the one or more UAVs, transmitting avoidance commands to the one or more UAVs from an avoidance device located at a no-fly zone, and disrupting radio communication to the one or more UAVs from the avoidance device (step 1504). The method 1500 can further include periodically receiving updates or additions to the one or more no-fly zones (step 1506).

Each geo-fence is defined by the associated coordinates comprising a set of latitude, longitude, and altitude values. That is, the geo-fence can be a geometric shape (of any variation or size) which defines a no-fly zone. Note, the no-fly zone can be complete (no UAVs 50 at any altitude) as well as altitude specific (UAVs 50 at some altitudes, but not others). Again, the no-fly zones can be for any reason telecommunication compounds/cell sites, data centers, historical monuments/locations, privacy centers, etc. The transmitting the geo-fences to the one or more UAVs can be performed by the UAV air traffic control system 300 for UAVs using one or more wireless networks to communicate to the one or more UAVs, as described herein.

Additionally, the transmitting the geo-fences to the one or more UAVs can be performed by the UAV air traffic control system 300 using one or more wireless networks to communicate to the one or more UAVs. The UAV air traffic control system 300 can be configured to monitor one or more of a location and a flight plan of the one or more UAVs and to transmit proximate geo-fences to the one or more UAVs based on the one or more of the location and the flight plan.

Figure 29:
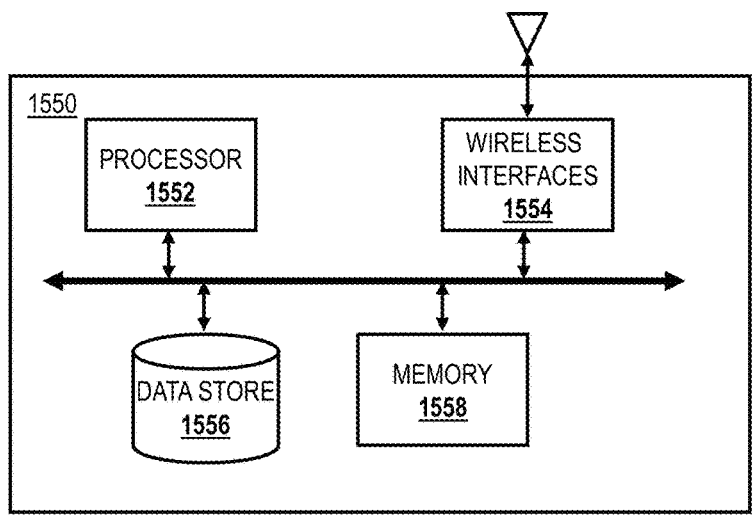
FIG. 29 is a block diagram of an avoidance device placed in a location to enforce a no-fly zone or geo-fence of UAVs.

Referring to FIG. 29, in an exemplary embodiment, a block diagram illustrates an avoidance device 1550 placed in a location to enforce a no-fly zone or geo-fence of UAVs 50. The avoidance device 1550 includes a processor 1552, wireless interfaces 1554, a data store 1556, and memory 1558. The avoidance device 1550 can include other functional components which are omitted for simplicity (e.g., power, a housing, a wired network interface, etc.). The avoidance device 1550 is a location specific device, placed at a no-fly zone. The objective of the avoidance device 1550 is to prevent UAVs 50 from flying in a no-fly zone defined by a geo-fence enforced by the avoidance device 1550. The avoidance device 1550 can be used with or without the UAV air traffic control system 300.

For example, with the push for drone delivery, the avoidance device 1550 is critical to pair with the avoidance sensors already attached to UAVs 50 as a safety measure. The avoidance device 1550 can be accessed locally or remotely via a network (such as the wireless networks) and programmed. This can include receiving the geo-fence coordinates, receiving commands to power up/power down the geo-fence, receiving commands to change the geo-fence, etc. For example, the avoidance device 1550 could power the geo-fence down to allow UAV 50 maintenance at the location.

The wireless interfaces 1554 can include LTE/cellular interfaces, Wi-Fi interfaces, and UAV-compliant interfaces, i.e., the wireless interfaces 1554 can support multiple different wireless protocols and Radio Frequencies. Using the LTE/cellular interfaces, Wi-Fi interfaces, etc., the wireless interfaces 1554 can support remote communication with the avoidance device 1550.

For the wireless interfaces 1554 operating the UAV-compliant interfaces, the UAV-compliant interfaces are configured to i) communicate the avoidance commands to proximate UAVs over Radio Frequencies associated with the one or more UAVs and/or ii) disrupt radio communication to the one or more UAVs from the avoidance device.

The UAVs 50 operate on the RC frequency band therefore cellular calls and data usage is not be disrupted if the avoidance device 1550 is powered on and blocking UAVs 50. The avoidance device 1550 can operate with a database in the data store 1556 with coordinate data (Lat/Long/Altitude data) for geo-fencing the UAVs or UAV RF blocking solution to still allow calls/data. The UAV RF blocking can broadcast at a set power level based on a desired area for blocking.

The avoidance device 1550 includes a transmitter configured to communicate the avoidance commands to proximate UAVs over Radio Frequencies associated with the one or more UAVs. Herein, the avoidance device 1550 can be programmed with a plurality of avoidance commands based on a type of UAV 50 and the avoidance device 1550 is configured to transmit the plurality of avoidance command over the Radio Frequencies associated with the one or more UAVs 50. Also, the avoidance device 1550 can include transmitter configured to perform the disrupting over Radio Frequencies associated with the one or more UAVs, wherein the Radio Frequencies do not interfere with other wireless networks. The avoidance device 1550 can be communicatively coupled to UAV air traffic control system 300 using one or more wireless networks.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for preventing flight of one or more Unmanned Aerial Vehicles (UAVs) in no-fly zones, the method comprising:

receiving one or more no-fly zones each defined as geo-fences with associated coordinates;

preventing one or more UAVs from entering the one or more no-fly zones by transmitting the geo-fences to the one or more UAVs by an Air Traffic Control (ATC) system for UAVs using one or more wireless networks to communicate to the one or more UAVs, wherein each UAV is constrained in flight based on cell coverage of the one or more wireless networks; and preventing the one or more UAVs from entering a specific no-fly zone by one of:
transmitting avoidance commands to the one or more UAVs from an avoidance device located at the specific no-fly zone, and
disrupting radio communication to the one or more UAVs from the avoidance device.

2. The method of claim 1, wherein each geo-fence is defined by the associated coordinates comprising a set of latitude, longitude, and altitude values.

3. The method of claim 1, further comprising: periodically receiving updates or additions to the one or more no-fly zones.

4. The method of claim 1, wherein the avoidance device comprises a transmitter configured to communicate the avoidance commands to proximate UAVs over Radio Frequencies associated with the one or more UAVs.

5. The method of claim 4, wherein the avoidance device is programmed with a plurality of avoidance commands based on a type of UAV and the avoidance device is configured to transmit the plurality of avoidance command over the Radio Frequencies associated with the one or more UAVs.

6. The method of claim 1, wherein the avoidance device comprises a transmitter configured to perform the disrupting over Radio Frequencies associated with the one or more UAVs, wherein the Radio Frequencies do not interfere with other wireless networks.

7. The method of claim 1, wherein the ATC system is configured to monitor one or more of a location and a flight plan of the one or more UAVs and to transmit proximate geo-fences to the one or more UAVs based on the one or more of the location and the flight plan.

8. The method of claim 1, wherein the avoidance device is communicatively coupled to an Air Traffic Control (ATC) system for UAVs using one or more wireless networks.

9. The method of claim 1, wherein the avoidance device is selectively enabled.

10. An avoidance device for preventing flight of one or more Unmanned Aerial Vehicles (UAVs) in no-fly zones, the avoidance device comprising:
wireless interfaces;
a processor communicatively coupled to the wireless interfaces; and
memory storing instructions that, when executed, cause the processor to
receive one or more no-fly zones each defined as geo-fences with associated coordinates;
prevent one or more UAVs from entering the one or more no-fly zones by transmission of the geo-fences to the one or more UAVs by an Air Traffic Control (ATC) system for UAVs using one or more wireless networks to communicate to the one or more UAVs, wherein each UAV is constrained in flight based on cell coverage of the one or more wireless networks; and
prevent the one or more UAVs from entering a specific no-fly zone by one of:
transmission of avoidance commands to the one or more UAVs located at the specific no-fly zone, and
disruption of radio communication to the one or more UAVs.

11. The avoidance device of claim 10, wherein each geo-fence is defined by the associated coordinates comprising a set of latitude, longitude, and altitude values.

12. The avoidance device of claim 10, wherein the memory storing instructions that, when executed, further cause the processor to: periodically receive updates or additions to the one or more no-fly zones.

13. The avoidance device of claim 10, wherein the transmission of avoidance commands is to proximate UAVs over Radio Frequencies associated with the one or more UAVs.

14. The avoidance device of claim 13, wherein the avoidance device is programmed with a plurality of avoidance commands based on a type of UAV and the avoidance device is configured to transmit the plurality of avoidance command over the Radio Frequencies associated with the one or more UAVs.

15. The avoidance device of claim 10, wherein the disruption of radio communication disrupts over Radio Frequencies associated with the one or more UAVs, wherein the Radio Frequencies do not interfere with other wireless networks.

16. The avoidance device of claim 10, wherein the ATC system is configured to monitor one or more of a location and a flight plan of the one or more UAVs and to transmit proximate geo-fences to the one or more UAVs based on the one or more of the location and the flight plan.

17. The avoidance device of claim 10, wherein the avoidance device is communicatively coupled to an Air Traffic Control (ATC) system for UAVs using one or more wireless networks.

18. The avoidance device of claim 10, wherein the avoidance device is selectively enabled.

* * * * *